US012654107B2

(12) United States Patent
Chu et al.

(10) Patent No.: US 12,654,107 B2
(45) Date of Patent: Jun. 16, 2026

(54) GAME DATA VERIFICATION METHOD AND APPARATUS, DEVICE, COMPUTER-READABLE STORAGE MEDIUM, AND COMPUTER PROGRAM PRODUCT

(71) Applicant: Tencent Technology (Shenzhen) Company Limited, Shenzhen (CN)

(72) Inventors: Jianfeng Chu, Shenzhen (CN); Jie Gong, Shenzhen (CN); Chunyan Ren, Shenzhen (CN); Mingwen Zou, Shenzhen (CN); Jingyi Hu, Shenzhen (CN); Wenhui Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 316 days.

(21) Appl. No.: 18/378,566

(22) Filed: Oct. 10, 2023

(65) Prior Publication Data

US 2024/0149170 A1 May 9, 2024

Related U.S. Application Data

(63) Continuation of application No. PCT/CN2023/111933, filed on Aug. 9, 2023.

(30) Foreign Application Priority Data

Nov. 4, 2022 (CN) .......................... 202211376603.2

(51) Int. Cl.
*A63F 13/73* (2014.01)
*A63F 13/35* (2014.01)
*A63F 13/71* (2014.01)

(52) U.S. Cl.
CPC .............. *A63F 13/71* (2014.09); *A63F 13/35* (2014.09); *A63F 13/73* (2014.09); *A63F 2300/401* (2013.01)

(58) Field of Classification Search
CPC ....................................................... A63F 13/73
See application file for complete search history.

(56) References Cited

U.S. PATENT DOCUMENTS

| | | | | |
|---|---|---|---|---|
| 12,003,647 B2 * | 6/2024 | Jayachandran | ....... | H04L 9/3239 |
| 2008/0125217 A1 * | 5/2008 | Pavlovski | ............. | A63F 13/332 |
| | | | | 463/31 |

(Continued)

FOREIGN PATENT DOCUMENTS

| | | |
|---|---|---|
| CN | 105214310 A | 1/2016 |
| CN | 105641930 A | 6/2016 |

(Continued)

OTHER PUBLICATIONS

Tencent Technology, ISR, PCT/CN2023/111933, Nov. 9, 2023, 3 pgs.

(Continued)

*Primary Examiner* — Jay Trent Liddle

(74) *Attorney, Agent, or Firm* — Morgan, Lewis & Bockius LLP

(57) ABSTRACT

Disclosed are a game data verification method performed by an electronic device. The method includes: generating a target sequence of target nodes in response to a game start instruction; acquiring target game data corresponding to each of the target nodes, the target game data including game state data and encrypted state data; performing authenticity verification on the target game data of a current target node according to the encrypted state data of a previous target node and the game state data of the current target node; performing accuracy verification on the target game data of the current target node according to the game state data of (Continued)

the current target node and game logic; and after determining that all the target game data corresponding to the target sequence is authentic data and accurate data based on an authenticity verification result and an accuracy verification result, determining that the game verification succeeds.

17 Claims, 7 Drawing Sheets

(56)                References Cited

U.S. PATENT DOCUMENTS

| | | | |
|---|---|---|---|
| 2019/0168124 A1* | 6/2019 | Haile | ..................... A63F 13/803 |
| 2022/0032184 A1 | 2/2022 | Zhang et al. | |
| 2022/0410014 A1* | 12/2022 | Yu | ........................... A63F 13/35 |
| 2023/0122552 A1* | 4/2023 | Meyers | .................. G06F 21/10 |
| | | | 463/29 |

FOREIGN PATENT DOCUMENTS

| | | | |
|---|---|---|---|
| CN | 108111464 | A | 6/2018 |
| CN | 110598481 | A | 12/2019 |
| CN | 112717417 | A | 4/2021 |
| CN | 113827955 | A | 12/2021 |
| CN | 114504827 | A | 5/2022 |

OTHER PUBLICATIONS

Yuan Chenjuan et al., "Credible Depository Chain System of Card Games", Journal of Applied Sciences, vol. 38, Issue 1, DOI: 10.3969/j.issn.0255-8297.2020.01.006, Jan. 2020, 12 pgs.

* cited by examiner

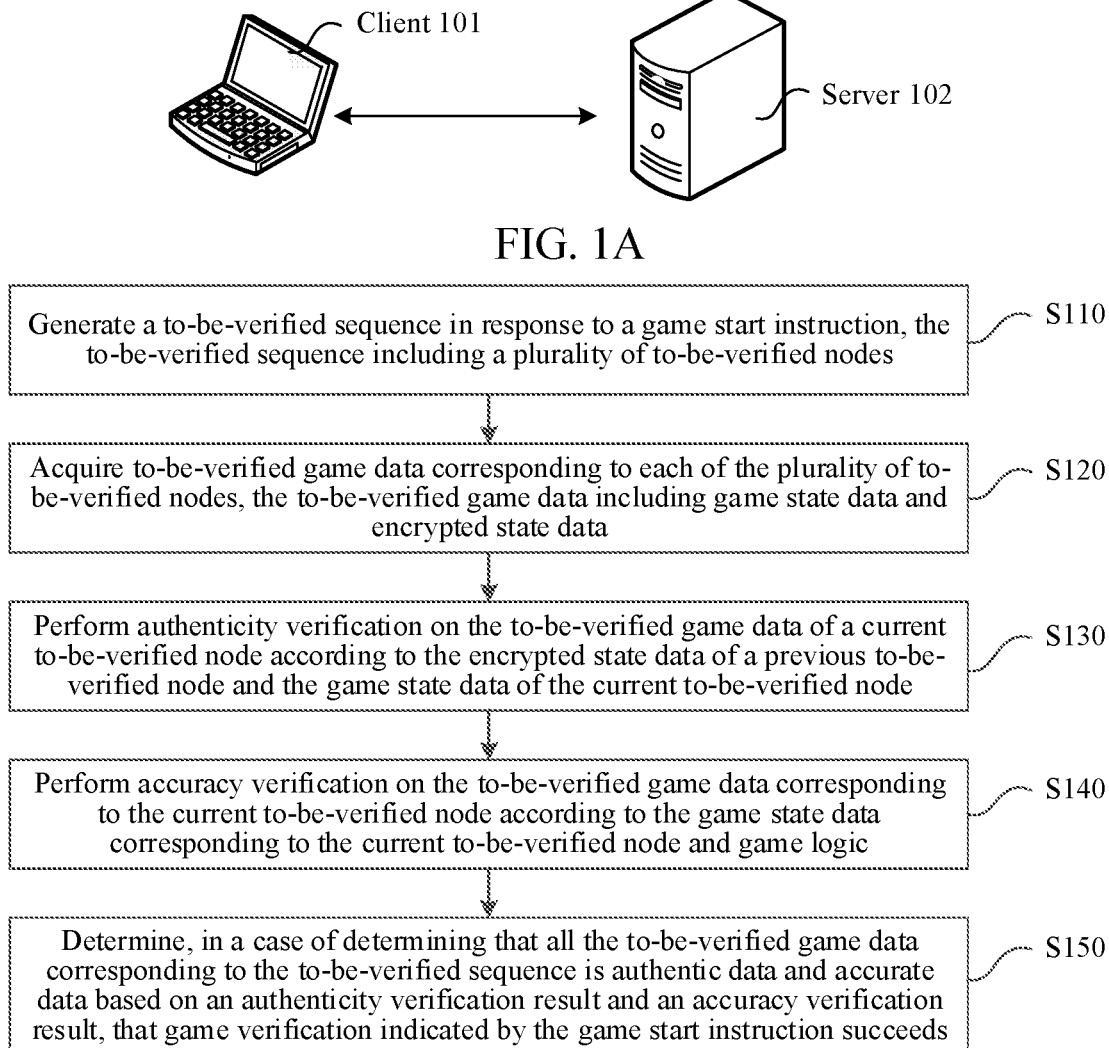

Client 101

Server 102

FIG. 1A

Generate a to-be-verified sequence in response to a game start instruction, the to-be-verified sequence including a plurality of to-be-verified nodes ⟋ S110

Acquire to-be-verified game data corresponding to each of the plurality of to-be-verified nodes, the to-be-verified game data including game state data and encrypted state data ⟋ S120

Perform authenticity verification on the to-be-verified game data of a current to-be-verified node according to the encrypted state data of a previous to-be-verified node and the game state data of the current to-be-verified node ⟋ S130

Perform accuracy verification on the to-be-verified game data corresponding to the current to-be-verified node according to the game state data corresponding to the current to-be-verified node and game logic ⟋ S140

Determine, in a case of determining that all the to-be-verified game data corresponding to the to-be-verified sequence is authentic data and accurate data based on an authenticity verification result and an accuracy verification result, that game verification indicated by the game start instruction succeeds ⟋ S150

FIG. 1B

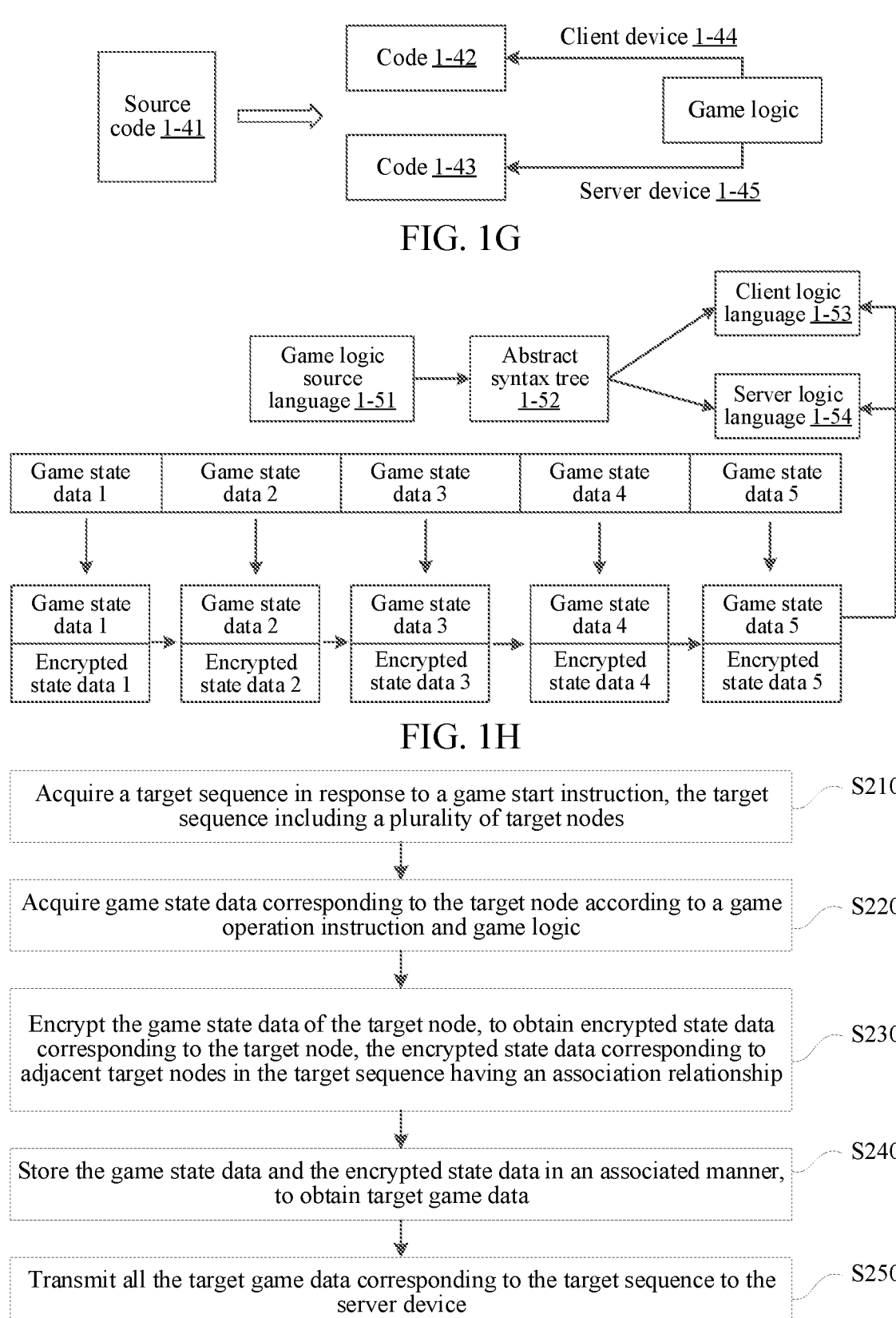

Acquire a target sequence in response to a game start instruction, the target sequence including a plurality of target nodes — S210

Acquire game state data corresponding to the target node according to a game operation instruction and game logic — S220

Encrypt the game state data of the target node, to obtain encrypted state data corresponding to the target node, the encrypted state data corresponding to adjacent target nodes in the target sequence having an association relationship — S230

Store the game state data and the encrypted state data in an associated manner, to obtain target game data — S240

Transmit all the target game data corresponding to the target sequence to the server device — S250

FIG. 2A

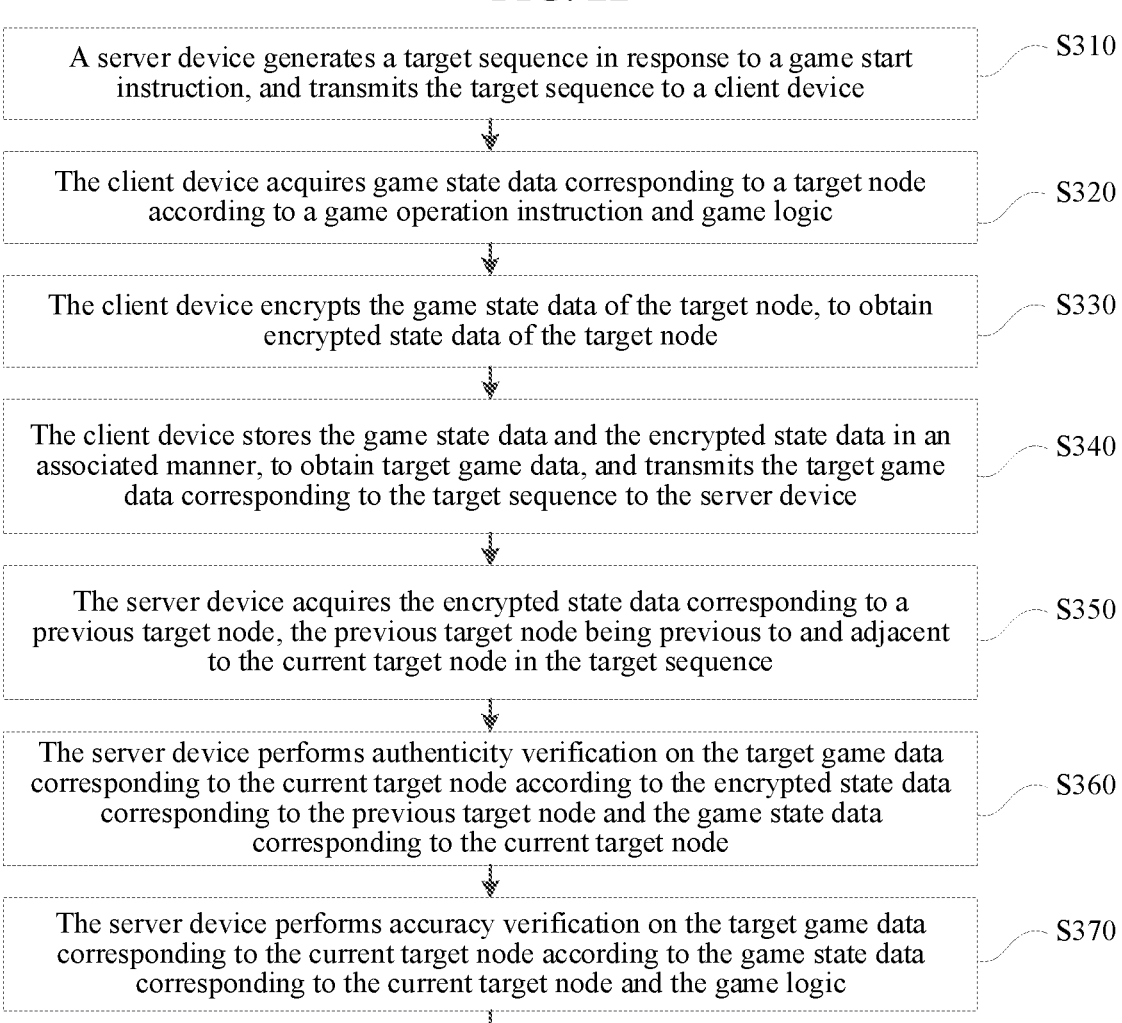

FIG. 2D

A server device generates a target sequence in response to a game start instruction, and transmits the target sequence to a client device ⌐ S310

The client device acquires game state data corresponding to a target node according to a game operation instruction and game logic ⌐ S320

The client device encrypts the game state data of the target node, to obtain encrypted state data of the target node ⌐ S330

The client device stores the game state data and the encrypted state data in an associated manner, to obtain target game data, and transmits the target game data corresponding to the target sequence to the server device ⌐ S340

The server device acquires the encrypted state data corresponding to a previous target node, the previous target node being previous to and adjacent to the current target node in the target sequence ⌐ S350

The server device performs authenticity verification on the target game data corresponding to the current target node according to the encrypted state data corresponding to the previous target node and the game state data corresponding to the current target node ⌐ S360

The server device performs accuracy verification on the target game data corresponding to the current target node according to the game state data corresponding to the current target node and the game logic ⌐ S370

The server device determines, in a case of determining that all the target game data corresponding to the target sequence is authentic data and accurate data based on an authenticity verification result and an accuracy verification result, that game verification indicated by the game start instruction succeeds ⌐ S380

FIG. 3A

GAME DATA VERIFICATION METHOD AND APPARATUS, DEVICE, COMPUTER-READABLE STORAGE MEDIUM, AND COMPUTER PROGRAM PRODUCT

CROSS-REFERENCE TO RELATED APPLICATIONS

This application is a continuation application of PCT Patent Application No. PCT/CN2023/111933, entitled "GAME DATA VERIFICATION METHOD AND APPARATUS, DEVICE, COMPUTER-READABLE STORAGE MEDIUM, AND COMPUTER PROGRAM PRODUCT" filed on Aug. 9, 2023, which is based upon and claims priority to Chinese Patent Application No. 202211376603.2, entitled "GAME DATA VERIFICATION METHOD AND APPARATUS, DEVICE, COMPUTER-READABLE STORAGE MEDIUM, AND COMPUTER PROGRAM PRODUCT" filed on Nov. 4, 2022, all of which is incorporated herein by reference in its entirety.

FIELD OF THE TECHNOLOGY

This application relates to the field of game technologies, and specifically, to a game data verification method and apparatus, a device, a computer-readable storage medium, and a computer program product.

BACKGROUND OF THE DISCLOSURE

With the continuous development of science and technology, in order to enrich people's life, computer games are becoming increasingly popular. In most games, people need to control virtual objects to move in virtual scenes. The game logic is usually jointly maintained by a client and a server. In order to maintain the fairness of the game, the client needs to submit game data to the server at the end of the game, and the server verifies the game data to ensure the authenticity and accuracy of the game data.

However, because the server does not intervene with behaviors in the game during the game, cheating of players easily occurs. For example, a player uses a tool to forge authentic data in the client, and consequently, when the game data is submitted to the server for verification, the verification on the authenticity and accuracy of the game data is affected.

SUMMARY

Embodiments of this application provide a game data verification method and apparatus, a device, a computer-readable storage medium, and a computer program product, which can quickly identify the authenticity and accuracy of game data.

An embodiment of this application provides a game data verification method performed by an electronic device, and the method including:

generating a target sequence in response to a game start instruction, the target sequence including a plurality of target nodes;

acquiring target game data corresponding to each of the plurality of target nodes, the target game data including game state data and encrypted state data, the encrypted state data of adjacent target nodes in the target sequence having an association relationship;

performing authenticity verification on the target game data of a current target node according to the encrypted state data of a previous target node and the game state data of the current target node, the previous target node being immediately preceding the current target node in the target sequence;

performing accuracy verification on the target game data of the current target node according to the game state data of the current target node and game logic; and after determining that all the target game data corresponding to the target sequence is authentic data and accurate data based on an authenticity verification result and an accuracy verification result, determining that game verification indicated by the game start instruction succeeds.

An embodiment of this application further provides a game data verification method, applicable to a client device, and including:

acquiring a target sequence in response to a game start instruction, the target sequence including a plurality of target nodes;

acquiring game state data of the target node according to a game operation instruction and game logic;

encrypting the game state data of the target node, to obtain encrypted state data of the target node, the encrypted state data of adjacent target nodes in the target sequence having an association relationship;

storing the game state data and the encrypted state data in an associated manner, to obtain target game data; and transmitting all the target game data corresponding to the target sequence to a server device, the server device being configured to verify the target game data according to the association relationship and the game logic.

An embodiment of this application further provides an electronic device, including a processor and a memory, the memory storing a plurality of instructions, when the electronic device is a server device, the processor loading the instructions from the memory, to perform the steps in the game data verification method applicable to the electronic device provided in the embodiments of this application.

An embodiment of this application further provides a non-transitory computer-readable storage medium, storing a plurality of instructions that, when executed by a processor of an electronic device, to perform the steps in the game data verification method provided in the embodiments of this application.

The embodiments of this application includes at least the following beneficial effects: In response to a game start instruction, a target sequence including a plurality of target nodes is generated, and target game data corresponding to each of the plurality of target nodes is acquired; there is an association relationship between the target game data, so that authenticity verification on the target game data can be performed by using encrypted state data of a previous target node and game state data of a current target node; accuracy verification on the target game data can be performed by using the game state data and game logic; and finally, when the target game data of all the target nodes is authentic and accurate, it is determined that the verification succeeds. Because whether the data is authentic can be determined according to the association relationship between the target game data, and whether the data is accurate can be determined by using the game logic and the game state data, the authenticity and accuracy of the target game data can be quickly identified.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application.

FIG. 1A is a schematic scenario diagram of a game data verification method according to an embodiment of this application.

FIG. 1B is a schematic flowchart of a game data verification method according to an embodiment of this application.

FIG. 1G is a schematic diagram of generating preset game logic according to an embodiment of this application.

FIG. 1H is an overall framework diagram of a game data verification method according to an embodiment of this application.

FIG. 2A is another schematic flowchart of a game data verification method according to an embodiment of this application.

FIG. 2D is a schematic diagram of an association between target game data according to an embodiment of this application.

FIG. 3A is still another schematic flowchart of a game data verification method according to an embodiment of this application.

DESCRIPTION OF EMBODIMENTS

Figures 1C, 1D, 1E, 1F:
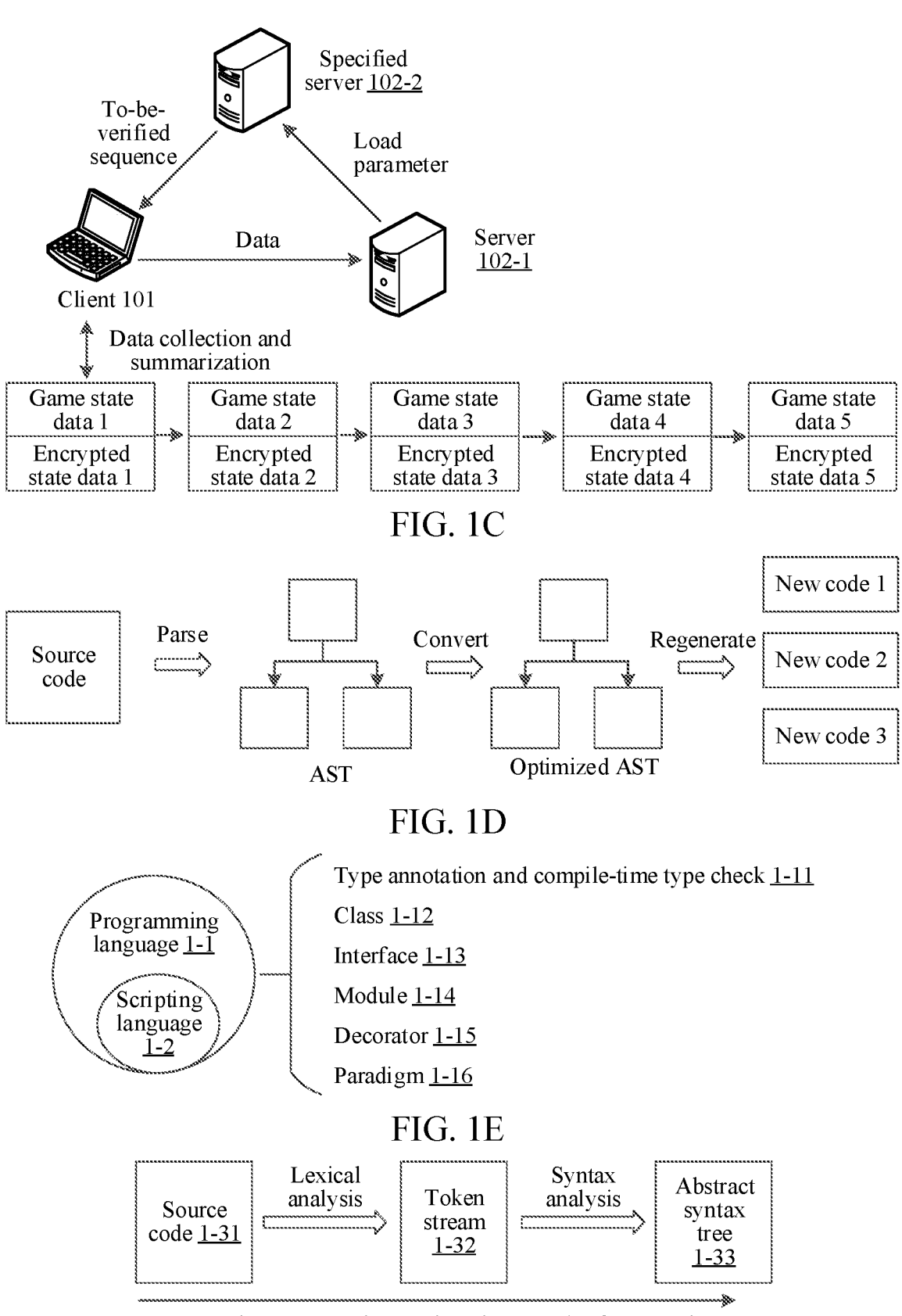
FIG. 1C is a schematic diagram of dynamically adjusting an amount of target game data according to an embodiment of this application.
FIG. 1D is a schematic diagram of generating a plurality of pieces of different code with the same logic based on source code according to an embodiment of this application.
FIG. 1E is a schematic diagram of a programming language (TypeScript) according to an embodiment of this application.
FIG. 1F is a schematic flowchart of generating an abstract syntax tree (AST) from source code according to an embodiment of this application.

The technical solutions in embodiments of this application are clearly and completely described below with reference to the accompanying drawings in the embodiments of this application. Apparently, the embodiments to be described are merely some rather than all of the embodiments of this application. All other embodiments obtained by a person skilled in the art based on the embodiments of this application without creative efforts shall fall within the protection scope of this application.

Embodiments of this application provide a game data verification method and apparatus, a device, a computer-readable storage medium, and a computer program product.

The first game data verification apparatus and the second game data verification apparatus may be both integrated into an electronic device. The electronic device may be a device such as a terminal or a server. The terminal may be a device such as a mobile phone, a tablet computer, an intelligent Bluetooth device, a notebook computer, or a personal computer (PC). The server may be a single server or a server cluster that includes a plurality of servers.

In some embodiments, the first game data verification apparatus may alternatively be integrated into a plurality of electronic devices. For example, the first game data verification apparatus may be integrated into a plurality of servers, and the plurality of servers implement the game data verification method applicable to a server device provided in the embodiments of this application.

In some embodiments, the server may alternatively be implemented in the form of a terminal.

For example, FIG. 1A is a schematic diagram of an application scenario of a game data verification method according to an embodiment of this application.

As shown in FIG. 1A, a client 101 and a server 102 are located in a wireless network or wired network, and the client 101 may be communicatively connected to the server 102.

A game program may be run on the client 101, and the client 101 may receive a game start instruction, and then transmit the game start instruction to the server 102, so that the server 102 may generate a target sequence, and transmit the generated target sequence to the client 101, the target sequence including a plurality of target nodes. Subsequently, the client 101 may acquire game state data corresponding to the target node based on a game operation instruction and game logic; and encrypt the game state data of the target node, to obtain encrypted state data corresponding to the target node, the encrypted state data corresponding to adjacent target nodes in the target sequence having an association relationship; and then the client 101 may store the encrypted state data and the game state data corresponding to the target node in an associated manner, to obtain the target game data corresponding to the target node; and finally transmit the full target game data corresponding to the target sequence to the server 102.

The server 102 may receive the full target game data corresponding to the target sequence, and then acquire the encrypted state data corresponding to a previous target node, the previous target node being immediately preceding a current target node in the target sequence; then perform authenticity verification on the target game data corresponding to the current target node according to the encrypted state data corresponding to the previous target node and the game state data corresponding to the current target node; according to the game state data corresponding to each target node and the game logic, perform accuracy verification on the target game data corresponding to the target node; and if all the target game data corresponding to the target sequence is authentic data and accurate data, determine that game verification indicated by the game start instruction succeeds.

In some implementations, the client 101 and the server 102 may alternatively be nodes in a blockchain. The blockchain is a new application mode of computer technologies such as distributed data storage, point-to-point transmission, a consensus mechanism, and an encryption algorithm. The blockchain is essentially a decentralized database and is a string of data blocks generated through association by using a cryptographic method. Each data block includes information of a batch of network transactions, the information being used for verifying the validity of information of the data block (anti-counterfeiting) and generating a next data block. The blockchain may include a blockchain underlying platform, a platform product service layer, and an application service layer.

The blockchain underlying platform may include processing modules such as a user management module, a basic service module, a smart contract module, and an operation monitoring module. The user management module is configured to identity information management of all blockchain participants, including maintaining public-private key generation (account management), key management, maintaining a correspondence between the real identity of a user and a blockchain address (permission management), and the like, supervising and auditing transaction conditions of some real identities with authorization, and providing rule configuration of risk control (risk control auditing). The basic service module is deployed on all blockchain node devices and configured to verify the validity of a service request, and after a consensus is reached on a valid request, record the valid request in storage. For a new service request, the basic service module first parses interface adaptation and performs authentication processing (interface adaptation), then encrypts service information by using a consensus algorithm (consensus management), transmits the complete and consistent service information after encryption to a shared ledger (network communication), and performs recording and storing. The smart contract module is configured for contract registration and publication, contract triggering, and contract execution. A developer may define contract logic by using a programming language, and release the contract logic onto a blockchain (contract registration). According to the logic of contract items, a key or another event is invoked to trigger execution, to complete the contract logic. The function of upgrading or canceling a contract is further provided. The operation monitoring module is mainly configured for deployment, configuration modification, contract setting, and cloud adaptation during product releasing and visualized output of a real-time status during product operation, for example, alarming, monitoring network conditions, and monitoring a health status of a node device.

The platform product service layer provides basic capabilities and an implementation framework of an application. Based on these basic capabilities, developers may superpose characteristics of services and complete blockchain implementation of service logic. The application service layer provides a blockchain solution-based application service for use by a service participant.

Detailed descriptions are separately provided below with reference to the game data verification method provided in this embodiment of this application.

In this embodiment of this application, a game data verification method is provided, which may be applied to a server device, for example, a server. As shown in FIG. 1B, a process of the game data verification method may include S110 to S150, and the steps are performed by the server device. The steps are separately described below.

S110: Generate a target sequence in response to a game start instruction, the target sequence including a plurality of target nodes.

The game start instruction refers to an instruction to start a game, for example, an instruction to start a round of game. In some implementations, the game start instruction may be generated in response to a user operation. For example, a "start" control may be displayed on a game interface, and when a trigger operation on the "start" control is detected, a game start instruction may be generated to start the game.

In some implementations, the game start instruction may be automatically generated by a game system when a certain condition is met. For example, a "start" control is displayed on the game interface, when a trigger operation on the "start" control is detected, a timing function may be started, and when the timing reaches a preset value, a game start instruction is automatically generated to start the game.

The game start instruction may be acquired by a client device, and the client device transmits the game start instruction to the server device, so that the server device can acquire the game start instruction. After acquiring the game start instruction, the server device may generate a target sequence, the target sequence including a plurality of target nodes.

The target node is a node in the game used for indicating a game progress, for example, a level in the game or a specified event in the game. The target sequence is a set formed by a plurality of target nodes, and in the target sequence, the plurality of target nodes are sorted according to appearance time thereof in the game. For example, there are five levels in total in the game, each level is a target node, a level 2 is started after a level 1 is passed, a level 3 can be started after the level 2 is passed, and by analogy, the generated target sequence may be [level 1, level 2, level 3, level 4, level 5].

In some implementations, the target sequence may include all preset nodes in the game. The preset node refers to a game node that is set in advance during game design; and when a player passes through the preset node, it can be determined that the player has passed the level. In response to the game start instruction, the server device may use each of all the preset nodes in the game as a target node to form a target sequence. For example, there are three preset nodes of the game in total, which are respectively a node A, a node B, and a node C. If the target sequence includes all the preset nodes, when the server device receives a game start instruction 1, the generated target sequence may be [node A, node B, node C]; and when the server device receives a game start instruction 2, the generated target sequence is also [node A, node B, node C].

In other words, for the same game, each time the server device receives a game start instruction, a corresponding target sequence is generated. If the target sequence includes all preset nodes in the game, the target sequence generated based on the game start instruction each time is the same.

It may be understood that, all the preset nodes in the game are used as target nodes, which represents that game data of each preset node needs to be verified, so that relatively large data processing pressure will be generated. In order to balance the processing pressure of the server device, and properly use resources of the server device, the data volume of target nodes may be dynamically adjusted based on a load parameter of the server device. Therefore, in some implementations, when generating the target sequence in response to the game start instruction, the server device may acquire a load parameter of the server device according to a time interval parameter; determine a target verification factor based on the acquired load parameter in response to the game start instruction; determine a quantity of target nodes according to the target verification factor; and select target nodes from all the preset nodes in the game (which are referred to as a game node sequence) according to the quantity of target nodes, and generate the target sequence based on the plurality of selected target nodes.

The server device may acquire the load parameter of the server device once according to the time interval parameter, where the time interval parameter is a preset time interval, and may be any preset time interval, for example, 30 minutes or 1 hour, which may be specifically set according to actual requirements, and is not specifically limited herein.

The load parameter is a parameter used for representing busyness of the server device, and may include CPU usage, internal memory usage, and the like. The CPU usage refers to CPU resources occupied by a running program. The internal memory usage refers to the internal memory used by all processes in the server device. Generally, excessively high CPU usage (higher than a CPU usage threshold) will affect the running of other programs, while excessively high internal memory usage (higher than an internal memory usage threshold) will affect the overall performance.

In some implementations, the server device may refer to a server cluster. In this case, each server in the server cluster may report a load parameter of the server to a specified server according to the preset time interval, and the specified server performs an operation of generating a target sequence based on the load parameter.

In response to the game start instruction, a target verification factor may be determined based on a currently acquired load parameter, where the target verification factor is a parameter indicating a quantity of target nodes, and the target verification factor may be a ratio of the quantity of target nodes to a total quantity of preset nodes, and may alternatively refer to a fixed quantity of target nodes.

In some implementations, when determining the target verification factor based on the load parameter, the server device may acquire a mapping relationship between load ranges and verification factors, determine a load range within which the load parameter falls as a target load range; and determine a verification factor corresponding to the target load range as the target verification factor according to the mapping relationship.

The mapping relationship between the load ranges and the verification factors may be preset, and then the load range within which the load parameter falls is determined as the target load range; and then a verification factor having a mapping relationship with the target load range is determined as the target verification factor.

In some implementations, if the server device is a server cluster, and one server in the server cluster is used as a specified server, the specified server may receive load parameters of a plurality of servers, perform mean processing on the received load parameters of the plurality of servers, and determine a target load range according to the load parameters after mean processing.

For example, the server cluster includes a server X, a server Y, a server Z, and a server W, where the server X is a specified server. The server Y reports a load parameter y to the server X, the server Z reports a load parameter z thereof to the server X, and the server W reports a load parameter w thereof to the server X. When the server X performs mean processing on the load parameters of the plurality of servers, it may be that an average value of the load parameter y, the load parameter z, and the load parameter w is calculated for subsequent determining of the target load range.

Herein, the specified server may alternatively select the largest load parameter from the plurality of load parameters of the plurality of servers, and determine the target load range according to the largest load parameter.

The load parameter may include CPU usage and internal memory usage. When mean processing is performed on the plurality of received load parameters, it may be that mean processing is performed on a plurality of pieces of CPU usage, and mean processing is performed on a plurality of pieces of internal memory usage, so as to determine the target load range based on the CPU usage after mean processing and the internal memory usage after mean processing.

When determining a load range within which the load parameter falls, the server device may determine, based on the larger one of the CPU usage and the internal memory usage, the load range within which the load parameter falls. For example, the CPU usage is 25%, the internal memory usage is 31%, and the internal memory usage is higher than the CPU usage, then 31% is used to determine the load range within which the load parameter falls.

For example, for the mapping relationship between the load ranges and the verification factors, reference may be made to Table 1.

TABLE 1

| Load range | [10%, 20%) | [10%, 20%) | [20%, 30%) | [30%, 40%) | [40%, 100%] |
|---|---|---|---|---|---|
| Verification factor | 100% | 80% | 60% | 40% | 20% |

As in the foregoing example, the CPU usage is 25%, the internal memory usage is 31%, and the load range of 31% is [30%, 40%), then 40% can be determined as the target verification factor. The examples in Table 1 are for reference only, and setting may be performed according to actual requirements in actual processing. In addition, during actual setting, a value corresponding to the load range is negatively correlated with a value corresponding to the verification factor.

If the target verification factor is the quantity of target nodes, the server device may directly acquire the quantity of target nodes. If the target verification factor is the ratio of the quantity of target nodes to the total quantity of preset nodes, the server device may use the ratio as a quantity weight for weighted calculation with the total quantity of preset nodes, to obtain the quantity of target nodes. For example, the target verification factor is 80%, and the total quantity of preset nodes is 100, then the quantity of target nodes is 80.

After determining the quantity of target nodes, the server device may select target nodes from all the preset nodes in the game based on the quantity of target nodes, and generate a target sequence based on the plurality of selected target nodes.

In some implementations, the server device may randomly extract target nodes from all the preset nodes in the game according to the quantity of target nodes. For example, the quantity of target nodes is 80, then 80 target nodes are randomly extracted from the preset nodes.

In some implementations, to ensure that game data of important nodes in the preset nodes can be verified, the server device may acquire node priorities corresponding to the preset nodes; select target nodes from the preset nodes based on the node priorities and the quantity of target nodes; and generate a target sequence according to a chronological order of the target nodes in the game.

The node priorities may be preset, and the node priorities may be used for indicating the importance of the preset nodes. A higher node priority indicates higher importance of the preset node.

In some implementations, the server device may sequentially determine the target nodes in descending order of the node priorities of the preset nodes. For example, all the preset nodes in the game are sorted in descending order of the node priorities, and then the quantity of target nodes of target nodes with the highest node priority are selected based on the sorting result. For example, the quantity of target nodes is 80, then the first 80 preset nodes are selected as target nodes.

In some implementations, the node priorities may include three levels: high, medium, and low. If the quantity of target nodes is less than or equal to the quantity of preset nodes with high node priorities, the server device directly selects a corresponding quantity of target nodes from the preset nodes with high node priorities. For example, there are 30 preset nodes with high node priorities in total, and the quantity of target nodes is 20, then 20 preset nodes are directly selected from the preset nodes with high node priorities.

If the quantity of target nodes is greater than the quantity of preset nodes with high node priorities, all the preset nodes with high node priorities may be determined as target nodes, a quantity of the remaining target nodes may be calculated, and the remaining target nodes may be extracted from the remaining preset nodes randomly or based on the node priorities. For example, there are 30 preset nodes with high node priorities in total, and the quantity of target nodes is 80, then all the preset nodes with high node priorities are directly determined as target nodes, and the 50 remaining target nodes are randomly extracted from other preset nodes. Alternatively, the 50 remaining target nodes may alternatively be first extracted from preset nodes with medium node priorities, and then extracted from preset nodes with low node priorities when all the preset nodes with medium node priorities are extracted.

Finally, a target sequence is generated according to a chronological order of the target nodes in the game. For example, the target nodes are a level 1, a level 3, and a level 6, the level 1 appears before the level 3, and the level 3 appears before the level 6, then the generated target sequence may be [level 1, level 3, level 6].

If the load parameter is greater than a preset value, for example, when the load parameter exceeds 90%, alarm processing may be performed, so as to notify the staff to expand the capacity of the server device.

S120: Acquire target game data corresponding to each of the plurality of target nodes, the target game data including game state data and encrypted state data.

After the server device generates the target sequence, the target sequence may be transmitted to the client device, so that the client device submits the target game data corresponding to the target nodes to the server device.

The target game data includes game state data and encrypted state data, and the encrypted state data corresponding to adjacent target nodes in the target sequence having an association relationship. The game state data is obtained by the client device based on a game operation instruction and game logic, the encrypted state data is obtained by encrypting the game state data of a current target node and the encrypted state data of a previous target node, where the previous target node is a target node adjacent to and previous to the current target node in the target sequence, and the current target node is any target node in the target sequence other than the first target node.

For example, the target sequence is [target node 1, target node 2, target node 3, encrypted state data A2 corresponding to the target node 1 and encrypted state data B2 corresponding to the target node 2 have an association relationship, and the encrypted state data B2 corresponding to the target node 2 and encrypted state data C2 corresponding to the target node 3 have an association relationship.

When generating the target sequence, the server device may dynamically adjust the quantity of target nodes according to the load parameter, so that an amount of target game data can be dynamically adjusted. For example, FIG. 1C is a schematic diagram of dynamically adjusting the amount of target game data. That is, a server 102-1 may report the load parameter to a specified server 102-2, and the specified server 102-2 generates a target sequence and transmits the target sequence to a client 101. The client 101 collects and summarizes data according to the target sequence, and then submits the summarized data to the server for verification. When the load parameter is different, the determined quantity of target nodes contained in the target sequence is different, so that the amount of target game data submitted by the client 101 to the server 102-1 is also different.

In the target game data corresponding to all the target nodes submitted by the client device to the server device, there is an association relationship between the encrypted state data of adjacent target nodes. Therefore, the encrypted state data of the previous target node and the encrypted state data of the target node have an association relationship. For example, the target sequence is [target node 1, target node 2, target node 3], then the previous target node of the target node 2 is the target node 1, and the previous target node of the target node 3 is the target node 2.

Because the server device has acquired the target game data corresponding to all the target nodes, the encrypted state data of the previous target node can be obtained.

S130: Perform authenticity verification on the target game data of a current target node according to the encrypted state data of a previous target node and the game state data of the current target node.

The server device may perform authenticity verification on the target game data corresponding to a target node according to the encrypted state data corresponding to a previous target node and the game state data corresponding to the target node.

Because the encrypted state data of adjacent target nodes has an association relationship, if the target game data of one of adjacent target nodes is modified, the target game data corresponding to all target nodes after the modified target node needs to be modified; otherwise, the association relationship will be abnormal, thereby reducing the difficulty of game data anomaly detection and improving the accuracy of game data verification. Therefore, the server device may perform authenticity verification on the target game data according to a manner in which the client device establishes the association relationship.

For example, as shown in FIG. 1C, the encrypted state data of each current target node may be obtained by the client device by using the encrypted state data of the previous target node. For example, in FIG. 1C, encryption results of game state data 2 and game state data 1 are encrypted to obtain encrypted state data 2, so as to establish an association relationship. Therefore, the server device may calculate the encrypted state data of other target nodes (for example, encrypted state data 3 to 5 corresponding to the game state data 3 to 5 in FIG. 1C) in the same manner for authenticity verification. In addition, in FIG. 1C, the encrypted state data 1 is the encryption result of the game state data 1.

In some implementations, the encrypted state data may include a first hash value and a second hash value, the first hash value being obtained by performing a first hash calculation on the game state data of the current target node by the client device, and the second hash value being obtained by performing a second hash calculation on the encrypted state data of the previous target node by the client.

The first hash calculation refers to processing that the client device performs a hash calculation on the game state data of the previous target node, and the second hash calculation refers to processing that the client device performs a hash calculation on the game state data of the current target node. Hash calculation, also referred to as "hash", can receive any set of input information of any length, and is used for transforming the input information into a fixed-length output in a data fingerprint form through a hash algorithm. For example, an output is a combination of letters and numbers, then the output is a hash value. For example, in a grid jumping game, a player may control a virtual object in the game to jump in the direction of a next grid based on a game operation instruction, so that the virtual object can jump to the next grid. In the game scene, each game operation instruction may correspond to one piece of game state data. For example, the game state data corresponding to the game operation instruction is "2 m-5 m-7 m", which means that the virtual object jumps 5 m at a position with a distance of 2 m from the starting point of the game and reaches a place with a distance of 7 m from the starting point of the game. By using the first hash calculation, the client may transform the game state data "2 m-5 m-7 m" into a first hash value Q11, and then acquire the encrypted state data of a previous target node, for example, Q01 and Q02, and then a second hash calculation is performed on Q01 and Q02 to obtain a second hash value Q12.

Therefore, in order to verify the authenticity of the target game data, the server device may recalculate the first hash value and the second hash value in the same calculation manner as the client device.

In some implementations, it may be that the server device performs a first hash calculation on the game state data corresponding to a current target node to obtain a first target hash value corresponding to the target node; performs a second hash calculation on the encrypted state data corresponding to the previous target node, to obtain a second target hash value corresponding to the target node; determines that the target game data corresponding to the target node is the authentic data when the first target hash value corresponding to the target node is consistent with the first hash value, and the second target hash value is consistent with the second hash value; and determines that the target game data corresponding to the target node is forged data when the first target hash value corresponding to the target node is inconsistent with the first hash value, or the second target hash value is inconsistent with the second hash value.

The server device performs a first hash calculation on the game state data of the current target node to obtain a first target hash value, and performs a second hash calculation on the encrypted state data of the previous target node to obtain a second target hash value. Subsequently, the first hash value and the first target hash value are compared, and the second hash value and the second target hash value are compared; if the first hash value is consistent with the first target hash value, and the second hash value is consistent with the second target hash value, it can be determined that the target game data of the current target node has not been tampered with and is the authentic data; and if the first hash value is inconsistent with the first target hash value, or the second hash value is inconsistent with the second target hash value, it can be determined that the target game data of the current target node has been illegally tampered with and is forged data.

S140: Perform accuracy verification on the target game data corresponding to the current target node according to the game state data corresponding to the current target node and game logic.

The game state data may include an initial state, an operation state, and an end state, where the game state data may correspond to a game operation instruction, that is, each game operation instruction corresponds to an initial state, an operation state, and an end state. The initial state is a state of a virtual object before receiving the control of the game operation instruction, the operation state refers to a state generated on the virtual object by the game operation instruction, and the end state refers to a state after the virtual object is controlled by the game operation instruction. For example, the virtual object is at a position with 1 m from the starting point, and the operation state corresponding to the game operation instruction is to move forward by 5 m, then the end state of the virtual object is being at a position with 6 m from the starting point.

The server device may perform accuracy verification on the target game data based on the game state data and the game logic. The game logic refers to preset basic logic of game running, which may include an instruction response manner, data processing, a calculation manner, and the like, to maintain the normal running of the game.

In some implementations, when performing accuracy verification, the server device may superimpose the operation state on the initial state according to the preset game logic, to obtain a target state corresponding to the game state data.

The initial state is the state of the virtual object before the game operation instruction controls the virtual object, and the operation state is the state generated by the game operation instruction. For example, in the foregoing grid jumping game, the game logic is that a sum of the initial state and the operation state is the target state. If the virtual object is at a position with a distance of 0 m, and the game operation instruction controls the virtual object to jump 2 m, the target state can be calculated by 0 m+2 m=2 m.

In another example, in a competitive game, a game operation instruction controls a virtual object with current hit points of 50 to be damaged, and the hit points are reduced by 10. The game logic is to directly reduce 10 based on the virtual object's current hit points, then through 50−10=40, the target state can be calculated: the hit points are 40.

In another example, the game operation instruction controls an attack power of the virtual character to be increased by 10%, and 10 points are increased. The game logic is to first increase the basic attack power of the virtual object by 10%, and then increase 10 points. If the basic attack power is 100, it is 100+100*10%=110, and 110+10=120, so that attack power being 120 is the target state.

The game state data corresponding to a target node may include a plurality of pieces of sub-game state data. If target states and end states of all the plurality of pieces of sub-game state data are consistent, the server device determines that the target game data corresponding to the target node is accurate; and if the target state and the end state of any piece of sub-game state data are inconsistent, the server device determines that the target game data corresponding to the target node is inaccurate.

If the target node includes a plurality of pieces of sub-game state data, the server device may verify each piece of sub-game state data. That is, for each piece of sub-game state data, the operation state may be superimposed on the initial state according to the game logic, to obtain the target state corresponding to the game state data. Subsequently, the target state and the end state are compared. If the target states and the end states of all sub-game state data in the target node are consistent, it can be determined that the target game data corresponding to the target node is accurate. If the target state and the end state of any piece of sub-game state data in the target node are inconsistent, it is determined that the target game data corresponding to the target node is inaccurate.

The sequence of the authenticity verification and the accuracy verification is not specifically limited in this embodiment of this application. In some implementations, the server device may first perform authenticity verification on all the target game data, and then perform accuracy verification. In some implementations, the server device may alternatively first perform accuracy verification on all the target game data, and then perform authenticity verification. In some implementations, the server device may perform authenticity verification and accuracy verification on one piece of target game data, and then verify the next piece of target game data.

During the authenticity verification, if the server device determines that a certain piece of target game data is forged data, the game verification may be terminated; and during the accuracy verification, if the server device determines that a certain piece of target game data is inaccurate data, the game verification may be terminated.

Because in this embodiment of this application, both the client device and the server device need to perform the state superposition calculation, the first hash calculation, and the second hash calculation, these calculation logic is the same on the client device and the server device. In order to ensure the accuracy and quickness of the verification, it is necessary to ensure that the game logic of the client device and the server device is consistent. At a game development stage, the game may be developed based on a set of code logic, which can not only increase the speed of game development, but also ensure that the game logic running on the client device and the server device is consistent.

In some implementations, it may be that an abstract syntax tree is generated based on source code of the game logic; nodes in the abstract syntax tree are optimized to obtain an optimized abstract syntax tree; and a game logic language of the client device and a game logic language of the server device are respectively generated based on the optimized abstract syntax tree. FIG. 1D is a schematic diagram of generating a plurality of pieces of different code with the same logic based on source code. An AST may be generated by parsing the source code, the AST is optimized to convert the AST into an optimized AST, and finally the optimized AST is used to regenerate different code, to obtain new code 1 to 3.

In an implementation, when generating the abstract syntax tree based on the source code of the game logic, the server device may acquire the source code of the game logic; generate an AST according to the source code; and use the AST to generate the game logic of the client device and the game logic of the server device. Based on the game logic of the client device and the preset game logic of the server device generated by AST, it can ensure that the logic of the client device and the server device is consistent, thereby reducing the verification error rate caused by different logic of the client device and the server device rate, and improving the accuracy of game data verification.

The source code may be written based on the scripting language TypeScript. TypeScript is built by adding static type definitions based on the scripting language JavaScript, and is a superset of JavaScript. In addition, TypeScript includes optional static types and class-based object-oriented programming. For example, FIG. 1E is a schematic diagram of TypeScript. A programming language 1-1 (Type-Script) is built based on a scripting language 1-2 (JavaScript), which may include type annotation and compile-time type check 1-11, class 1-12, interface 1-13, module 1-14, decorator 1-15, and paradigm 1-16.

The server device parses the source code to generate an AST, where the AST is a tree representation of an abstract syntax structure of the source code, and each node on the tree represents a structure in the source code. In some implementations, generating an AST according to the source code may include: performing lexical analysis on the source code to generate a token stream; and converting the token stream into an AST expression structure based on syntax analysis, to obtain the AST.

For example, FIG. 1F is a schematic flowchart of generating an AST from source code. When performing lexical analysis on the source code 1-31, the source code formed by character strings may be decomposed into meaningful code blocks, and these code blocks are a token stream 1-32. For example, for "let a=1", during lexical analysis, a token stream "let", "a", "=", "1" can be obtained, where whether a blank space is determined as a token stream is related to the meaning of the blank space in the corresponding language. By performing syntax analysis on the token stream, the token stream can be converted into an AST tree structure, thereby generating the abstract syntax tree 1-33 (AST). In some implementations, based on a script framework (Babylon), the source code 1-31 can be parsed into an AST based on the standard (ESTree specification). Babylon is a parser. The ESTree specification defines all syntax expression forms involved in JavaScript, and defines the syntax element description with a unified standard. Through the Babylon parser, an AST can be generated by using inputted JavaScript code character strings according to the ESTree specification.

After the AST is generated, the AST may be optimized, for example, performing a depth-first traversal on the AST, and during the depth-first traversal, performing optimization processing such as addition, updating, and removal operations on nodes in the AST, to remove useless code in the AST and perform pruning to remove useless branches in the AST.

In some implementations, the AST may be optimized by using a tool (Babel-Traverse), where Babel-Traverse is a tool for traversing the AST, which may be configured to maintain and operate the state of the AST, and defines an operation method for updating, adding, and removing the nodes on the AST. In actual processing, the node operation method provided by Babel-Traverse may be invoked to perform operations such as addition, deletion, modification, search, and verification on the nodes in the AST, thereby optimizing the AST.

After the server device obtains the optimized AST, the source code may be converted into a language type required in actual development based on the optimized AST. For example, the client device uses the JavaScript language, and the server device uses the Node.js language, so that the game logic of the client device and the game logic of the server device can be kept consistent. For example, FIG. 1G is a schematic diagram of generating game logic. Based on the same source code 1-41, code 1-42 (JavaScript code) and code 1-43 (Node.js code) in different languages and with the same logic are generated. The game logic of the client device 1-44 is consistent with the game logic of the server device 1-45.

For example, FIG. 1H is an overall framework diagram of a game data verification method. An abstract syntax tree 1-52 is generated based on a game logic source language 1-51, and then a client logic language 1-53 and a server logic language 1-54 with consistent logic are respectively generated based on the abstract syntax trees 1-52. The client logic language 1-53 may perform association on the game state data to obtain target game data, and the server may verify the received target game data based on the server logic language 1-54. Based on the same game logic, not only game development can be carried out quickly, but also quick and accurate game verification can be realized.

S150: Determine, when determining that all the target game data corresponding to the target sequence is authentic data and accurate data based on an authenticity verification result and an accuracy verification result, that game verification indicated by the game start instruction succeeds.

After the server device performs authenticity and accuracy verification on the target game data, when all the target game data corresponding to the target sequence are authentic data and accurate data, it can be determined that game verification indicated by the game start instruction succeeds; otherwise, it is determined that the game verification indicated by the game start instruction fails.

In some implementations, the server device may perform authenticity verification and accuracy verification on each piece of target game data, so that the authenticity and accuracy of each piece of target game data can be acquired, to determine whether the game verification indicated by the game start instruction. succeeds.

In some implementations, the server device may first perform authenticity verification on all the target game data. If there is one piece of target game data being forged data, it is directly determined that the game verification indicated by the game start instruction fails, and no subsequent accuracy verification is required.

In some implementations, the server device may first perform accuracy verification on all the target game data corresponding to the target sequence. If there is one piece of target game data being inaccurate data, it is directly determined that the game verification indicated by the game start instruction fails, and no subsequent authenticity verification is required.

In some implementations, the server device may alternatively perform accuracy verification and authenticity verification on one piece of target game data. After the verification is completed, a next piece of target game data continues to be verified. If there is one piece of target game data being forged data or inaccurate data, it is directly determined that the game verification indicated by the game start instruction fails.

In some implementations, the server device may further provide a game playback function on the client device based on the received target game data, where the game playback function may be used for displaying process details of the entire game or displaying wonderful moments in the game. Therefore, not only the verification on the game data can be realized, but also the game playback function can be provided, thereby enriching the game functions, and improving the user experience.

When determining that the game verification indicated by the game start instruction fails, the server device may impose corresponding penalties on the account playing the game, so as to maintain the fairness of the game.

The game data verification solution provided in this embodiment of this application may be applied to data verification scenarios in various games. For example, a webpage programming language (H5) mini-game is used as an example, and using the solution provided in this embodiment of this application can quickly perform authenticity and accuracy verification on the target game data submitted by the client device.

It can be seen from the above that, in this embodiment of this application, in response to a game start instruction, a target sequence including a plurality of target nodes is generated, and target game data corresponding to each of the plurality of target nodes is acquired; there is an association relationship between the target game data, so that authenticity verification on the target game data can be performed by using encrypted state data of a previous target node and game state data of a current target node; accuracy verification on the target game data can be performed by using the game state data and game logic; and finally, when the target game data of all the target nodes is authentic and accurate, it is determined that the verification succeeds. Because whether the data is authentic can be determined according to the association relationship between the target game data, and whether the data is accurate can be determined by using the game logic and the game state data, the authenticity and accuracy of the game data can be quickly identified.

In this embodiment of this application, a game data verification method is further provided, which may be applied to a client device. As shown in FIG. 2A, a process of the game data verification method may include S210 to S250, and the steps are performed by the client device. The steps are separately described below.

S210: Acquire a target sequence in response to a game start instruction, the target sequence including a plurality of target nodes.

After receiving the game start instruction, the client device may transmit the game start instruction to the server device, so that the server device may generate a target sequence according to the game start instruction, and transmit the target sequence to the client device, so that the client device can acquire the target sequence.

S220: Acquire game state data corresponding to the target node according to a game operation instruction and game logic.

The client device may calculate the game state data corresponding to the target node according to the game operation instruction and the game logic. The game operation instruction may include instructions for performing any operations on a virtual object, such as controlling movement of the virtual object, controlling the virtual object to perform a specified action, or controlling the virtual object to wear a virtual item.

One target node may correspond to a plurality of pieces of sub-game state data. For example, the target node may be understood as a certain level in a game, and a plurality of pieces of sub-game state data can be generated in this level.

S230: Encrypt the game state data of the target node, to obtain encrypted state data corresponding to the target node, the encrypted state data corresponding to adjacent target nodes in the target sequence having an association relationship.

In order to ensure the security of the game state data, the client device may encrypt the game state data corresponding to the target node to obtain corresponding encrypted state data.

In some implementations, when calculating the encrypted state data corresponding to each target node, the client device may use the encrypted state data of a previous target node for calculation, so that an association relationship can be established in the encrypted state data of adjacent target nodes.

In some implementations, the client device may directly encrypt the encrypted state data of the previous target node and the game state data of the current target node, to obtain the encrypted state data of the current target node.

In some implementations, the encrypted state data may include a first hash value and a second hash value, the first hash value being encrypted data corresponding to the game state data, and the second hash value being encrypted data for which an association relationship is established with the encrypted state data of the adjacent previous target node.

When encrypting the game state data of the target node to obtain the corresponding encrypted state data, the client device may perform the first hash calculation on the game state data corresponding to the current target node, to obtain a first hash value corresponding to the target node; acquire the encrypted state data corresponding to the previous target node of the target node in the target sequence; and perform the second hash calculation on the encrypted state data corresponding to the previous target node, to obtain a second hash value corresponding to the target node.

The encrypted state data of each target node may include a first hash value and a second hash value. The client device may perform the first hash calculation on the game state data of the current target node to obtain a first hash value; and when calculating a second hash value, the client device may perform the second hash calculation on the encrypted state data of the previous target node to obtain the second hash value. It can be seen that when calculating the encrypted state data of the target nodes, the calculation is performed sequentially according to the order of the target nodes in the target sequence.

The hash algorithms used in the embodiments of this application may include a message-digest algorithm (MD), a secure hash algorithm (SHA), a password hash function (SM3), and the like. The hash algorithms used in the first hash calculation and the second hash calculation may be selected according to actual requirements and are not specifically limited herein.

In some implementations, when calculating the first hash value corresponding to a target node, the client device may use the game state data of the current target node as to-be-calculated data, and perform the first hash calculation on the to-be-calculated data, to obtain at least one intermediate hash value; and when a quantity of the at least one intermediate hash value is not a target quantity, update the to-be-calculated data according to the at least one intermediate hash value, continue to perform the first hash calculation on updated to-be-calculated data, end the first hash calculation until a quantity of calculated intermediate hash values is the target quantity, and determine the target quantity of obtained intermediate hash values as the first hash value.

For each target node, the game state data corresponding to the target node may be used as to-be-calculated data, and then the first hash calculation is performed on the to-be-calculated data to obtain an intermediate hash value; and then the intermediate hash value continues to be used as to-be-calculated data to return to the process of performing the first hash calculation on the to-be-calculated data to obtain an intermediate hash value, until the quantity of calculated intermediate hash values is a target quantity, and the first hash value is obtained.

Figures 2B, 2C:
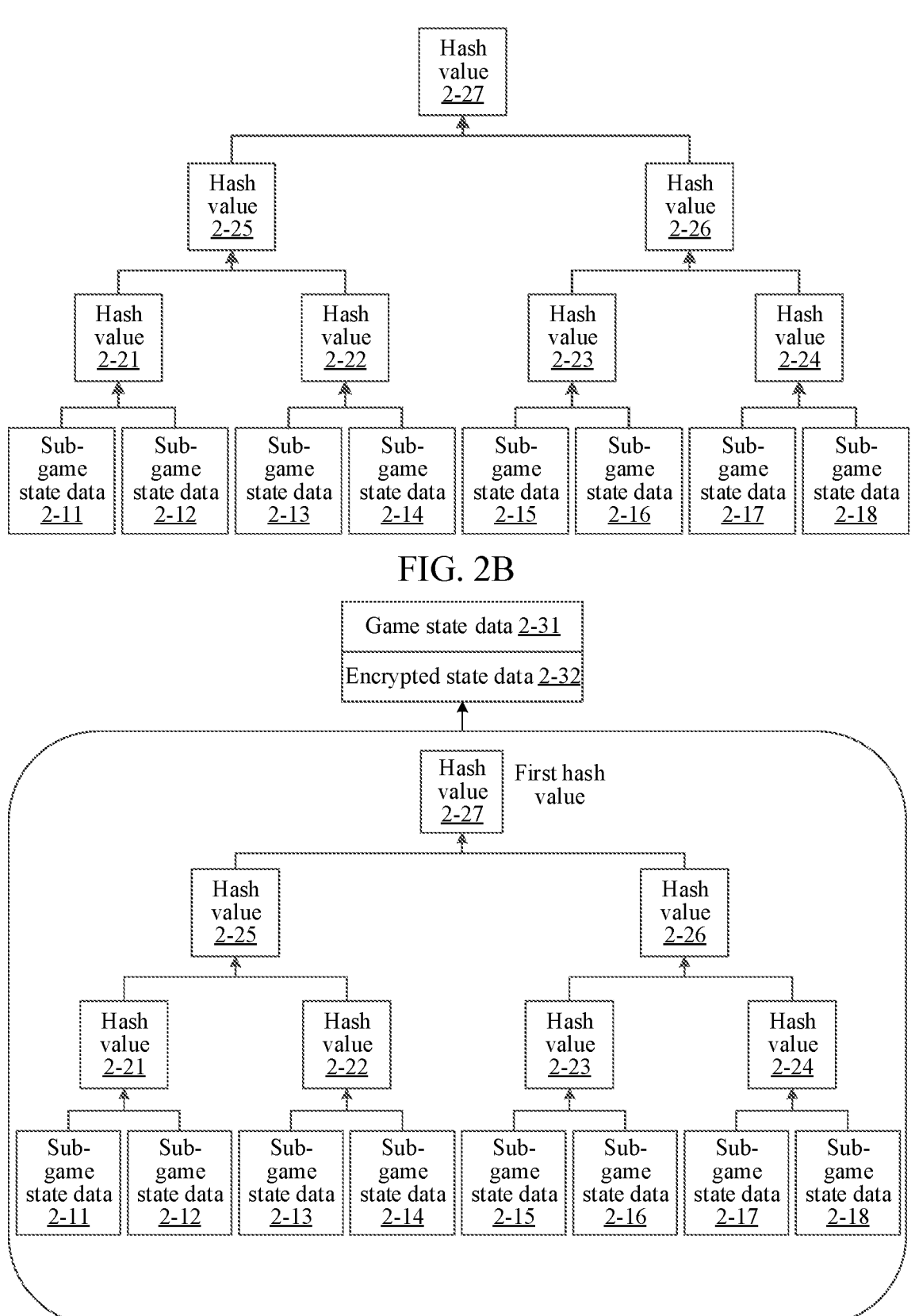
FIG. 2B is a schematic diagram of performing a first hash calculation according to an embodiment of this application.
FIG. 2C is a schematic diagram of obtaining target game data according to an embodiment of this application.

The first hash calculation refers to a calculation manner in which two pieces of to-be-calculated data are used as input information of a hash algorithm. For example, FIG. 2B is a schematic diagram of performing a first hash calculation. It is assumed that there are eight pieces of sub-game state data (sub-game state data 2-11 to sub-game state data 2-18) corresponding to a target node, and the target quantity is 1. The eight pieces of game state data are used as to-be-calculated data, and then a hash calculation is performed on two of the eight pieces of game state data. That is, a hash calculation is performed on the sub-game state data 2-11 and the sub-game state data 2-12, and a hash value 2-21 (Hash1) can be obtained; and a hash calculation is performed on the sub-game state data 2-13 and the sub-game state data 2-14, and a hash value 2-22 (Hash2) can be obtained. By analogy, a hash value 2-23 (Hash3) and a hash value 2-24 (Hash4) are obtained. Hash1, Hash2, Hash3, and Hash4 are intermediate hash values. If the quantity of intermediate hash values is not 1, Hash1, Hash2, Hash3, and Hash4 are used as to-be-calculated data, a hash calculation is performed on Hash1 and Hash2 to obtain a hash value 2-25 (Hash5), and a hash calculation is performed on Hash3 and Hash4 to obtain a hash value 2-26 (Hash6). In this case, the quantity of intermediate hash values is 2. A hash calculation continues to be performed on Hash5 and Hash6, to obtain a hash value 2-27 (Hash7). In this case, the quantity of intermediate hash values is 1, and Hash7 can be determined as the first hash value.

It may be understood that, based on that intermediate hash values are continuously calculated, and the calculation is stopped until a certain condition is finally met, all the sub-game state data can be associated with the first hash value. If one piece of the game state data is illegally tampered with, the corresponding intermediate hash value on the tree will be changed. For example, if the sub-game state data 2-13 is changed, Hash2, Hash5, and Hash7 will all be changed. Compared with directly splicing all the sub-game state data for hashing, calculating a plurality of intermediate hash values increases the calculation complexity of the first hash value, thereby making it more difficult to illegally tamper with the game state data, and improving the security of the target game data submitted to the server device.

When calculating the second hash value in the encrypted state data, the encrypted state data of the previous target node may be acquired directly. The previous target node refers to a target node adjacent to and previous to the target node, that is, the previous one target node, in the target sequence.

When calculating the encrypted state data of the first target node in the target sequence, because the first target node has no previous target node, the first hash value may be directly used as the second hash value. Therefore, the first hash value of the first target node in the target sequence may be the same as the second hash value.

When calculating the second hash value of the second target node, the client device may perform a second hash calculation on the encrypted state data of the first target node. For example, the client device may perform the second hash calculation on the first hash value of the first target node, or perform the second hash calculation on the second hash value of the first target node, or perform second hash calculation on the first hash value and the second hash value of the first target node.

In some implementations, the encrypted state data may also include a random number and a timestamp, where the timestamp may refer to a time at which the target node is reached in the game. The random number is a randomly generated value (for example, a random value from 0 to 232). During acquisition of the random number, the random number may be calculated based on a hash algorithm, a set target value, the first hash value, and the second hash value. For example, a hash value of the first hash value, the second hash value, and the random number calculated through the hash algorithm needs to be less than the target value. A hash value that meets this condition can be added to the encrypted state data. When tampering with the encrypted state data, the random number also needs to be modified, which increases the difficulty of tampering with the data, thereby improving the security of the data submitted by the client device.

When calculating a second hash value of the second target node, the client device may also jointly use the first hash value, the second hash value, the random number, and the timestamp in the first target node for the second hash calculation, to obtain the second hash value of the second target node.

In some implementations, manners of the first hash calculation and the second hash calculation may be different. For example, in the first hash calculation, a hash algorithm 1 is used to perform a pairwise hash calculation on the to-be-calculated data, and in the second hash calculation, the encrypted state data of a previous target node may be spliced into a whole, and a hash algorithm 2 is used for hash calculation. Certainly, the manners of the second hash calculation and the second hash calculation method may alternatively be the same. That is, in both of the manners, a pairwise hash calculation is performed, and the hash algorithms are the same. For example, the encrypted state data of the previous target node includes a first hash value, a second hash value, a timestamp, and a random number. In this case, a process of the second hash calculation includes: first performing a hash calculation on the first hash value and the second hash value to obtain a hash value A, performing a hash calculation on the timestamp and the random number to obtain a hash value B, and then perform a hash calculation on the hash value A and the hash value B to obtain a second hash value of the target node.

S240: Store the game state data and the encrypted state data in an associated manner, to obtain target game data.

S250: Transmit all the target game data corresponding to the target sequence to the server device.

The client device transmits all the target game data corresponding to the target sequence to the server device, so that the server device verifies the target game data according to the association relationship and the game logic.

After obtaining the encrypted state data corresponding to each target node, the client device may store the encrypted state data and the game state data corresponding to the target node in an associated manner according to the target node, to obtain the target game data corresponding to the target node.

In some implementations, based on FIG. 2B, FIG. 2C is a schematic diagram of acquiring target game data. The client device may store all intermediate hash values and the first hash value together with the game state data, where the intermediate hash values and the first hash value may form a hash tree, the first hash value and game state data 2-31 may be associated through the intermediate hash value, and the entire hash tree, the second hash value (that is, encrypted state Data 2-32), and the game state data 2-31 are stored together and submitted to the server device. Based on the intermediate hash values, the difficulty of data tampering can be increased, the data security can be improved, and when the server device performs authenticity verification, if it is found that the first hash value is inconsistent with the first target hash value calculated by the server device, the tampered game state data can be located by comparing the calculated intermediate hash values.

For example, still referring to FIG. 2B, if Hash7 calculated by the server device is inconsistent, comparison may be performed to determine whether the calculated Hash5 and Hash6 are consistent with those in the hash tree. If Hash5 is inconsistent with that in the hash tree, comparison continues to be performed to determine whether the calculated Hash1 and Hash2 are consistent with those in the hash tree. If Hash2 is inconsistent with that in the hash tree, the tampered data can be located as the sub-game state data 2, thereby accurately locating unauthentic game state data.

In some implementations, the client device may alternatively store the first hash value, the second hash value, and the game state data corresponding to the target node together.

It may be understood that, adjacent target game data has an association relationship. For example, FIG. 2D is a schematic diagram of an association between target game data. The second hash value of a target node 2-42 is obtained based on encrypted state data 1 of a target node 2-41. By analogy, the second hash value of a target node 2-4$n$ is obtained based on the encrypted state data n−1 of the target node 2-4$n$−1. Therefore, a chained association relationship may be formed between the target game data of all target nodes in the target sequence. In addition, each piece of encrypted state data includes a first hash value, a second hash value, a timestamp, and a random number. In the foregoing manner, the encrypted state data corresponding to each target node may be calculated, and in the target sequence, the encrypted state data of adjacent target nodes have a certain association relationship. If one piece of the data is tampered with, all subsequent data need to be changed, and the data tampering cost is high, so that the security of the data can be improved.

In some implementations, the client device may store the encrypted state data and the game state data of a target node as an array for associated storage.

In some implementations, the client device may also store the encrypted state data and the game state data of a target node as an element in a specified array, so that the specified array can be used for storing the target game data of all target nodes.

When transmitting the target game data corresponding to all the target nodes to the server device, the client device may directly transmit the specified array to the server device, so that the server device can verify the target game data.

In some implementations, the client device may transmit the target game data corresponding to all the target nodes to the server when the game indicated by the game start instruction ends. In some customs clearance games, target nodes may be levels, and there may be a situation in which a certain target node has not been reached when the game ends. For example, the target nodes includes the 100$^{th}$ level, but at the 80$^{th}$ level, the game ends. Consequently, the target game data of the target node of the 100$^{th}$ level cannot be acquired. In this case, the client only needs to report the acquired target game data corresponding to target nodes.

The target nodes in the target sequence may be non-consecutive game nodes, for example, the first level and the third level. The client device submits the target game data of the first level and the third level, and the encrypted state data of the first level and the encrypted state data of the third level have an association relationship.

It can be seen from the above that, in this embodiment of this application, a target sequence including a plurality of target nodes may be acquired in response to the game start instruction; game state data corresponding to the target node may be acquired according to a game operation instruction and preset game logic, and then the game state data is encrypted to obtain encrypted state data; then the encrypted state data and the game state data are used as the target game data corresponding to the target node, and submitted to the server device for data verification. Establishing an association relationship for the encrypted state data of adjacent target nodes can prevent data from being illegally tampered with, improve the security of the data, and facilitate the server device in performing the authenticity and accuracy verification based on the data.

In this embodiment of this application, a game data verification method is further provided. As shown in FIG. 3A, a specific process of the game data verification method may include S310 to S380, and the steps are separately described below.

S310: A server device generates a target sequence in response to a game start instruction, and transmits the target sequence to a client device.

S320: The client device acquires game state data corresponding to a target node according to a game operation instruction and game logic.

S330: The client device encrypts the game state data of the target node, to obtain encrypted state data of the target node.

S340: The client device stores the game state data and the encrypted state data in an associated manner, to obtain target game data, and transmits the target game data corresponding to the target sequence to the server device.

S350: The server device acquires the encrypted state data corresponding to a previous target node, the previous target node being immediately preceding the current target node in the target sequence.

S360: The server device performs authenticity verification on the target game data corresponding to the current target node according to the encrypted state data corresponding to the previous target node and the game state data corresponding to the current target node.

S370: The server device performs accuracy verification on the target game data corresponding to the current target node according to the game state data corresponding to the current target node and the game logic.

S380: The server device determines, when determining that all the target game data corresponding to the target sequence is authentic data and accurate data based on an authenticity verification result and an accuracy verification result, that game verification indicated by the game start instruction succeeds.

Figure 3B:
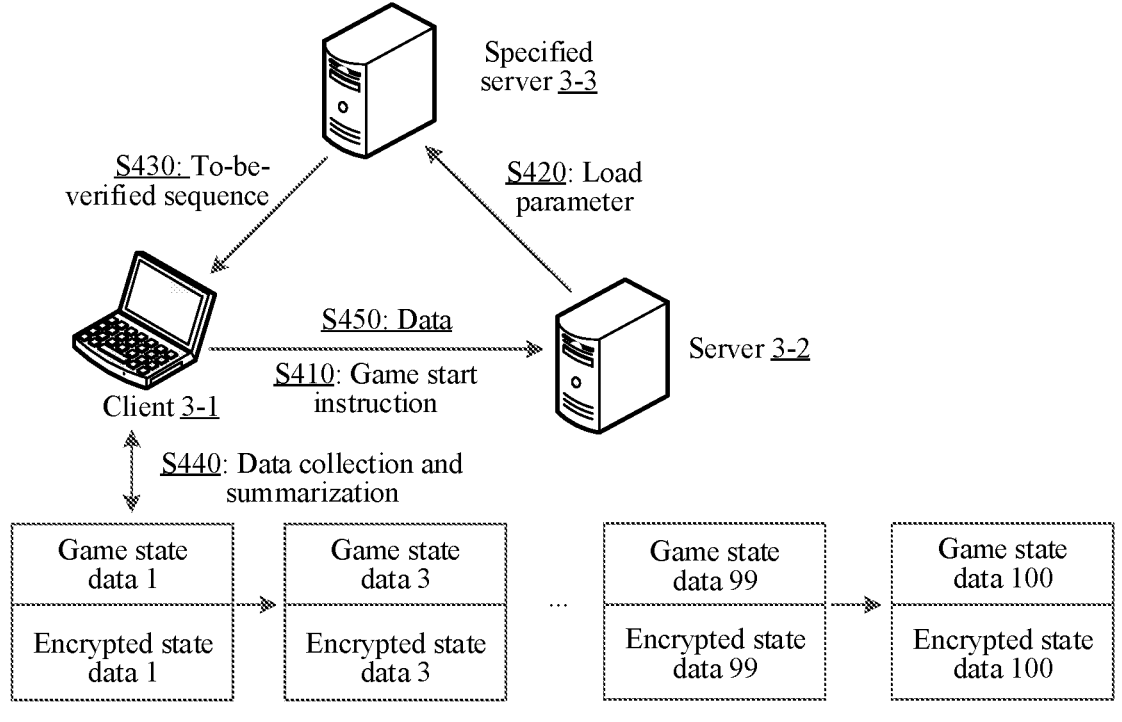
FIG. 3B is a schematic interaction diagram of a game data verification method according to an embodiment of this application.

For contents of S310 to S380, reference may be made to the corresponding parts of step 110 to step 150 and step 210 to step 250, and details are not described herein again. The game logic of the client device and the server device is the same. Therefore, at the game development stage, source code of the game logic may be written, then an abstract syntax tree is generated based on the source code, and then the abstract syntax tree is used to generate logic code of the client device and logic code of the server device, to ensure that the game logic of the client device and the game logic of the server device are kept consistent. In order to describe the foregoing process in detail, FIG. 3B is a schematic diagram of interaction between a client device and a server device.

S410: At a game running stage, after receiving a game start instruction, a client 3-1 (running on the client device) may transmit the game start instruction to a server 3-2 (referred to as the server device).

S420: The server 3-2 reports a load parameter to a specified server 3-3.

S430: The specified server 3-3 determines target nodes, and generates a target sequence based on the plurality of determined target nodes and transmits the target sequence to the client 3-1.

S440: The client 3-1 performs data collection and summarization. The client 3-1 may acquire the game state data corresponding to the target node according to a game operation instruction and game logic. Subsequently, in order to improve the security of the data, the game state data is encrypted to obtain the encrypted state data corresponding to the target node, and in the target sequence, the encrypted state data of adjacent target nodes has an association relationship.

For example, the client 3-1 may perform a first hash calculation on the game state data of the current target node to obtain a first hash value, and then perform a second hash calculation on the encrypted state data of the previous target node to obtain a second hash value. By analogy, the encrypted state data of each target node can be obtained. Subsequently, the encrypted state data and the game state data corresponding to the target node are stored in an associated manner, to obtain the target game data corresponding to the target node. In FIG. 3B, game state data 1 and encrypted state data 1, game state data 3 and encrypted state data 3, . . . , game state data 99 and encrypted state data 99, and game state data 100 and encrypted state data 100 are exemplarily shown. In this way, the target game data of adjacent target nodes also has an association relationship. If one piece of the target game data is tampered with, all subsequent data need to be changed, and the data tampering cost is high, thereby improving the security of the data.

S450. The client 3-1 submits the collected data to the server 3-2. After receiving the target game data of all target nodes, for each target node, the server 3-2 may first acquire the encrypted state data of the previous target node, that is, acquire the previous target node in the target sequence.

Subsequently, the server 3-2 may first perform authenticity verification on all the target game data, if it is determined that all the target game data is authentic data, continue the accuracy verification; and if one piece of the target game data is forged data, the server 3-2 may directly determine that the game verification corresponding to the game start instruction fails.

When performing authenticity verification on each piece of target game data, the server 3-2 may perform a first hash calculation on the game state data to obtain a first target hash value. If the first hash value and the first target hash value are the same, it can be determined that the target game data is authentic data; and if the first hash value and the first target hash value are different, it can be determined that the target game data is forged data.

After the authenticity verification succeeds, the server 3-2 may perform accuracy verification on each piece of target game data. If it is determined that all the target game data is accurate data, it can be determined that the game verification corresponding to the game start instruction succeeds; and if any piece of target game data is inaccurate data, it can be determined that the game verification corresponding to the game start instruction fails.

When perform accuracy verification on each piece of target game data, the second hash calculation may be performed on the encrypted state data of the previous target node to obtain a second target hash value; if the second hash value is the same as the second target hash value, it can be determined that the target game data is accurate data; and if the second hash value is different from the second target hash value, it can be determined that the target game data is inaccurate data.

It can be seen from the above that, in this embodiment of this application, at the game development stage, the game logic of the client and the server is always kept consistent, which can shorten the development cycle of the game and improve development quality of the game; at the game stage, the client may associate the target game data, and once one piece of the data is modified, there will be errors in all encryption calculation results, so as to improve the overall security of the game. In addition, during game data verification, the amount of target game data may be dynamically adjusted based on the load parameter of the server, thereby properly utilizing server resources and quickly performing the authenticity and accuracy verification on the target game data, making the game achieve balance in terms of security, resource utilization, and stability.

An embodiment of this application further provides a first game data verification apparatus. The first game data verification apparatus may be integrated into an electronic device. The electronic device may be a server device such as a terminal or a server.

For example, in an embodiment of this application, the method in this embodiment of this application is described in detail by using an example in which the first game data verification apparatus is integrated in a client device.

Figure 4A:
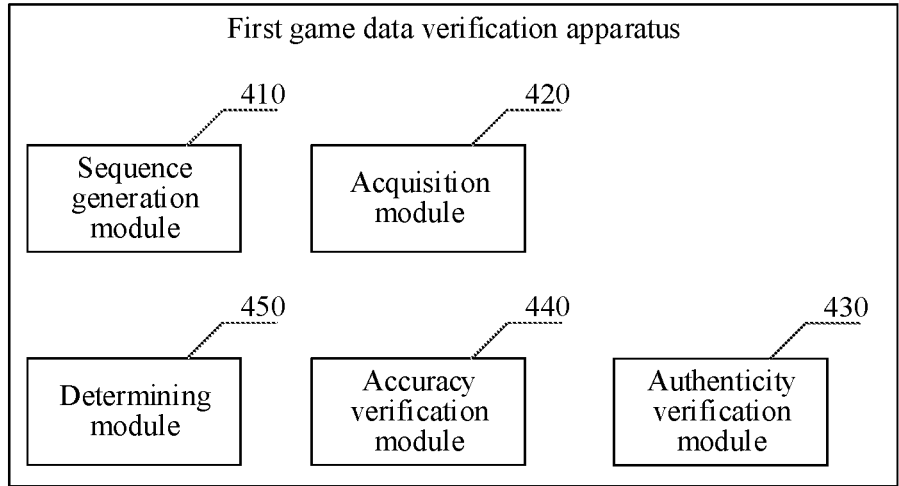
FIG. 4A is a schematic structural diagram of a game data verification apparatus according to an embodiment of this application.

For example, as shown in FIG. 4A, the first game data verification apparatus may include:

a sequence generation module 410, configured to generate a target sequence in response to a game start instruction, the target sequence including a plurality of target nodes;

an acquisition module 420, configured to acquire target game data corresponding to each of the plurality of target nodes, the target game data including game state data and encrypted state data, the encrypted state data of adjacent target nodes in the target sequence having an association relationship;

an authenticity verification module 430, configured to perform authenticity verification on the target game data of a current target node according to the encrypted state data of a previous target node and the game state data of the current target node, the previous target node being immediately preceding the current target node in the target sequence;

an accuracy verification module 440, configured to perform accuracy verification on the target game data of the current target node according to the game state data of the current target node and game logic; and a determining module 450, configured to determine, when determining that all the target game data corresponding to the target sequence is authentic data and accurate data based on an authenticity verification result and an accuracy verification result, that game verification indicated by the game start instruction succeeds.

In some embodiments, the sequence generation module 410 is further configured to: acquire a load parameter of the server device according to a time interval parameter; determine a target verification factor based on the load parameter in response to the game start instruction; determine a quantity of target nodes according to the target verification factor; and select target nodes from a game node sequence according to the quantity of target nodes, and generate the target sequence based on the plurality of selected target nodes.

In some embodiments, the sequence generation module 410 is further configured to: acquire a mapping relationship between load ranges and verification factors; determine a load range within which the load parameter falls as a target load range; and determine a verification factor corresponding to the target load range as the target verification factor according to the mapping relationship.

In some embodiments, the sequence generation module 410 is further configured to: acquire a node priority corresponding to each game node in the game node sequence; select the target nodes from the game node sequence based on the node priorities and the quantity of target nodes; and generate the target sequence by using the plurality of selected target nodes according to a chronological order of the target nodes in a game.

In some embodiments, the encrypted state data includes a first hash value and a second hash value, the first hash value being obtained by performing a first hash calculation on the game state data of the current target node by a client device, and the second hash value being obtained by performing a second hash calculation on the encrypted state data of the previous target node by the client device; and the authenticity verification module 430 is further configured to: perform the first hash calculation on the game state data of the current target node to obtain a first target hash value; perform the second hash calculation on the encrypted state data of the previous target node to obtain a second target hash value; and perform authenticity verification on the target game data of the current target node by verifying the first target hash value and the first hash value, and the second target hash value and the second hash value.

In some embodiments, the authenticity verification module 430 is further configured to: determine that the target game data of the current target node is the authentic data when it is found through verification that the first target hash value is consistent with the first hash value, and the second target hash value is consistent with the second hash value.

In some embodiments, the authenticity verification module 430 is further configured to: determine that the target game data of the current target node is forged data when any one of the following is found through verification: the first target hash value is inconsistent with the first hash value, or the second target hash value is inconsistent with the second hash value.

In some embodiments, the game state data includes an initial state, an operation state, and an end state, and the accuracy verification module 440 is further configured to: superimpose the operation state of the current target node on the initial state of the current target node according to the game logic, to obtain a target state; and perform accuracy verification on the target game data of the current target node by verifying the target state and the end state of the current target node; and In some embodiments, the accuracy verification module 440 is further configured to: determine that the target game data of the current target node is the accurate data when it is found through verification that the target state is consistent with the end state of the current target node.

In some embodiments, the accuracy verification module 440 is further configured to: determine that the target game data of the current target node is inaccurate data when it is found through verification that the target state is inconsistent with the end state of the current target node.

During specific implementation, the foregoing modules may be implemented as independent entities or may be combined in different manners or orders as a same entity or several entities for implementation. For specific implementations of the foregoing modules, refer to the foregoing method embodiments. Details are not provided herein again.

It can be seen from the above that, the first game data verification apparatus in this embodiment of this application may generate a target sequence according to a game start instruction, to acquire target game data, where the target game data of adjacent target nodes has an association relationship; whether data is authentic can be determined according to the association relationship, and whether the data is accurate can be determined by using preset game logic and game state data, so that the authenticity and accuracy of the game data can be quickly identified.

An embodiment of this application provides a second game data verification apparatus. The second game data verification apparatus may be specifically integrated into an electronic device. The electronic device may be a client device such as a terminal or a server.

For example, in an embodiment of this application, the method in this embodiment of this application is described in detail by using an example in which the second game data verification apparatus is integrated in a client device.

Figure 4B:
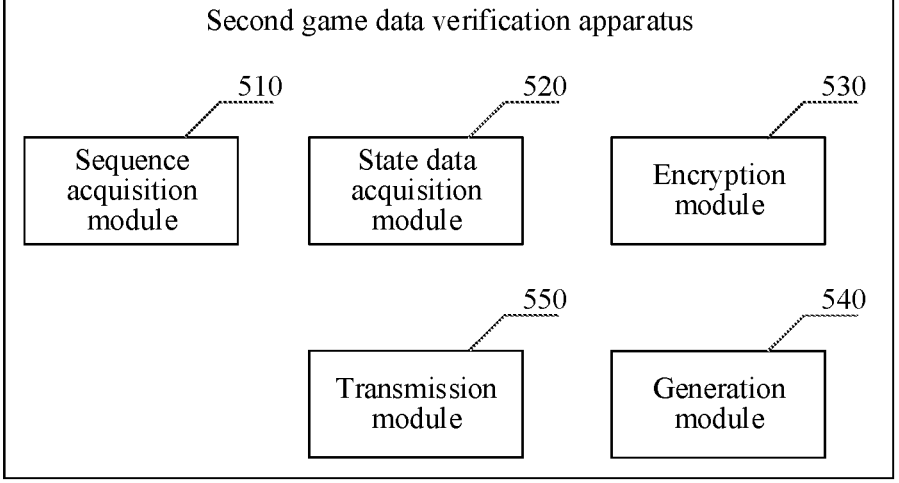
FIG. 4B is another schematic structural diagram of a game data verification apparatus according to an embodiment of this application.

For example, as shown in FIG. 4B, the second game data verification apparatus may include:

a sequence acquisition module 510, configured to acquire a target sequence in response to a game start instruction, the target sequence including a plurality of target nodes;

a state data acquisition module 520, configured to acquire game state data of the target node according to a game operation instruction and game logic;

an encryption module 530, configured to encrypt the game state data of the target node, to obtain encrypted state data of the target node, the encrypted state data of adjacent target nodes in the target sequence having an association relationship;

a generation module 540, configured to store the game state data and the encrypted state data in an associated manner, to obtain target game data; and a transmission module 550, configured to transmit all the target game data corresponding to the target sequence to a server device, the server device being configured to verify the target game data according to the association relationship and the game logic.

In some embodiments, the encryption module 530 is further configured to: perform a first hash calculation on the game state data of a current target node to obtain a first hash value of the current target node; acquire the encrypted state data of a previous target node, the previous target node being immediately preceding the current target node in the target sequence; perform a second hash calculation on the encrypted state data of the previous target node, to obtain a second hash value of the current target node; and determine the first hash value and the second hash value as the encrypted state data.

In some embodiments, the encryption module 530 is further configured to: use the game state data of the current target node as to-be-calculated data, and perform the first hash calculation on the to-be-calculated data, to obtain at least one intermediate hash value; and when a quantity of the at least one intermediate hash value is not a target quantity, update the to-be-calculated data according to the at least one intermediate hash value, continue to perform the first hash calculation on updated to-be-calculated data, end the first hash calculation until a quantity of calculated intermediate hash values is the target quantity, and determine the target quantity of obtained intermediate hash values as the first hash value.

In some embodiments, the state data acquisition module 520 is further configured to: acquire an initial state of the target node; calculate an operation state of the target node according to the game operation instruction and the game logic; superimpose the operation state on the initial state according to the game logic, to obtain an end state; and determine the initial state, the operation state, and the end state as the game state data of the target node.

It can be seen from the above that, the second game data verification apparatus in this embodiment of this application may acquire a target sequence including a plurality of target nodes in response to a game start instruction; acquire game state data corresponding to the target node according to a game operation instruction and preset game logic, and then encrypt the game state data to obtain encrypted state data, the encrypted state data of adjacent target nodes having an association relationship; and then use the encrypted state data and the game state data as target game data corresponding to the target node, and submit the target game data to the server device for data verification. Establishing an association relationship for the encrypted state data of adjacent target nodes can prevent data from being illegally tampered with, improve the security of the data, and facilitate the server device in performing the authenticity and accuracy verification based on the data.

Figure 5:
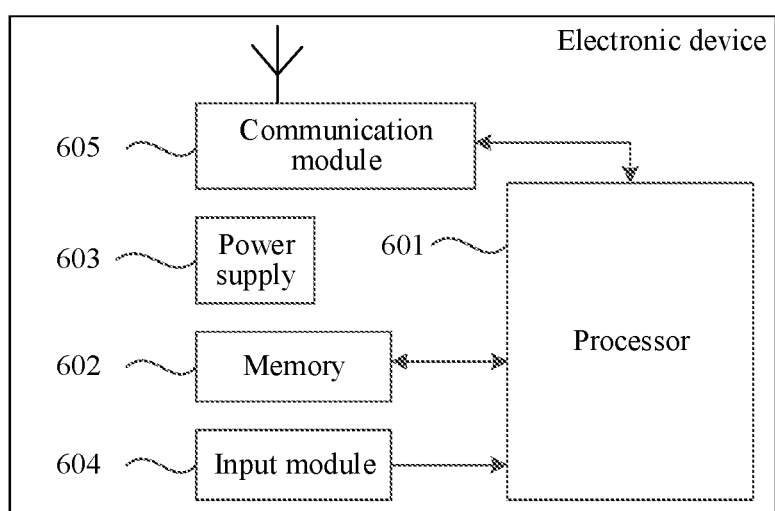
FIG. 5 is a schematic structural diagram of an electronic device according to an embodiment of this application.

FIG. 5 is a schematic structural diagram of an electronic device according to an embodiment of this application. The electronic device may include components such as a processor 601 including one or more processing cores, a memory 602 including one or more computer-readable storage media, a power supply 603, an input module 604, and a communication module 605. A person skilled in the art may understand that the electronic device structure shown in FIG. 5 does not constitute a limitation to the electronic device. The electronic device may include more or fewer components than those shown in the figure, or some components may be combined, or a different component deployment may be used.

The processor 601 is a control center of the electronic device, and connects various parts of the entire electronic device by using various interfaces and lines. By running or executing a software program and/or a module stored in the memory 602, and invoking data stored in the memory 602, the processor performs various functions of the electronic device and processes data, thereby performing overall monitoring on the electronic device. In some embodiments, the processor 601 may include one or more processing cores. In some embodiments, the processor 601 may integrate an application processor and a modem. The application processor mainly processes an operating system, a user interface, an application, and the like. The modem mainly processes wireless communication. It may be understood that, the foregoing modem may not be integrated into the processor 601.

The memory 602 may be configured to store a software program and module, and the processor 601 runs the software program and module stored in the memory 602, to implement various functional applications and data processing. The memory 602 may mainly include a program storage area and a data storage area. The program storage area may store an operating system, an application required by at least one function (such as a sound playback function and an image display function), and the like. The data storage area may store data created according to use of the electronic device, and the like. In addition, the memory 602 may include a high speed random access memory, and may further include a non-volatile memory, such as at least one magnetic disk storage device, a flash memory, or another volatile solid-state storage device. Correspondingly, the memory 602 may further include a memory controller, to allow the processor 601 to access the memory 602.

The electronic device further includes the power supply 603 for supplying power to the components. In some embodiments, the power supply 603 may be logically connected to the processor 601 by using a power management system, thereby implementing functions such as charging, discharging, and power consumption management by using the power management system. The power supply 603 may further include one or more of a direct current or alternating current power supply, a re-charging system, a power failure detection circuit, a power supply converter or inverter, a power supply state indicator, and any other component.

The electronic device may further include an input unit 604. The input unit 604 may be configured to receive inputted digit or character information, and generate a keyboard, mouse, joystick, optical or track ball signal input related to the user setting and function control.

The electronic device may further include the communication module 605. In some embodiments, the communication module 605 may include a wireless module. The electronic device may perform a short distance wireless transmission through the wireless module of the communication module 605, to provide wireless broadband Internet access for the user. For example, the communication module 605 may be configured to help a user to receive and send an email, browse a web page, access streaming media, and the like.

Although not shown in the figure, the electronic device may further include a display unit, and the like. Details are not described herein again. In this embodiment of this application, the processor 601 in the electronic device may load executable files corresponding to processes of one or more application programs to the memory 602 according to the following instructions, and the processor 601 runs the application program stored in the memory 602, to implement the game data verification method applicable to a server device provided in the embodiments of this application.

In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules or units. Moreover, each module or unit can be part of an overall module or unit that includes the functionalities of the module or unit. A person of ordinary skill in the art may understand that, all or some steps of the game data verification method provided in the embodiments of this application may be implemented by using instructions, or implemented through instructions controlling relevant hardware, and the instructions may be stored in a computer-readable storage medium and loaded and executed by a processor.

Accordingly, an embodiment of this application provides a computer-readable storage medium, storing a plurality of instructions, the instructions being capable of being loaded by a processor, to perform the game data verification method provided in the embodiments of this application.

The computer-readable storage medium may include: a read-only memory (ROM), a random access memory (RAM), a magnetic disk, an optical disc, or the like.

An embodiment of this application provides a computer program product or a computer program. The computer program product or the computer program includes computer instructions, the computer instructions being stored in a computer-readable storage medium. A processor reads the computer instructions from the computer-readable storage medium and executes the computer instructions to cause a server device to perform the game data verification method applicable to the server device provided in the embodiments of this application; or cause a client device to perform the game data verification method applicable to the client device provided in the embodiments of this application.

It may be understood that, in this embodiment of this application, relevant data such as game data are involved. When the embodiments of this application are applied to a specific product or technology, user permission or consent needs to be obtained, and the collection, use, and processing of relevant data need to comply with relevant laws, regulations, and standards of relevant countries and regions.

A game data verification method and apparatus, a device, a computer-readable storage medium, and a computer program product provided in the embodiments of this application are described above in detail. The foregoing descriptions are merely intended to help understand the method and the core idea of this application. In addition, a person skilled in the art may make modifications to the specific implementations and application range according to the idea of this application. In conclusion, the content of this specification is not to be construed as a limitation to this application.

What is claimed is:

1. A game data verification method performed by an electronic device, the method comprising:
   acquiring a load parameter of a server device according to a time interval parameter:
   determining a target verification factor based on the load parameter in response to a game start instruction;
   determining a quantity of target nodes according to the target verification factor;
   selecting a plurality of target nodes from a game node sequence according to the quantity of target nodes;
   generating a target sequence based on the plurality of selected target nodes;
   acquiring target game data corresponding to each of the plurality of selected target nodes, the target game data comprising game state data and encrypted state data, the encrypted state data of adjacent target nodes in the target sequence having an association relationship;
   performing authenticity verification on the target game data of a current target node according to the encrypted state data of a previous target node and the game state data of the current target node, the previous target node being immediately preceding the current target node in the target sequence;
   performing accuracy verification on the target game data of the current target node according to the game state data of the current target node and game logic; and
   after determining that all the target game data corresponding to the target sequence is authentic data and accurate data based on an authenticity verification result and an accuracy verification result, determining that game verification indicated by the game start instruction succeeds.

2. The method according to claim 1, wherein the determining a target verification factor based on the load parameter comprises:

acquiring a mapping relationship between load ranges and verification factors;

determining a load range within which the load parameter falls as a target load range; and determining a verification factor corresponding to the target load range as the target verification factor according to the mapping relationship.

3. The method according to claim 1, wherein the selecting the plurality of target nodes from a game node sequence according to the quantity of target nodes, and generating the target sequence based on the plurality of selected target nodes comprises:

acquiring a node priority corresponding to each game node in the game node sequence;

selecting the plurality of target nodes from the game node sequence based on the node priorities and the quantity of target nodes; and generating the target sequence by using the plurality of selected target nodes according to a chronological order of the target nodes in a game.

4. The method according to claim 1, wherein the encrypted state data comprises a first hash value and a second hash value, the first hash value being obtained by performing a first hash calculation on the game state data of the current target node by a client device, and the second hash value being obtained by performing a second hash calculation on the encrypted state data of the previous target node by the client device;

the performing authenticity verification on the target game data of a current target node according to the encrypted state data of a previous target node and the game state data of the current target node comprises:

performing the first hash calculation on the game state data of the current target node to obtain a first target hash value;

performing the second hash calculation on the encrypted state data of the previous target node to obtain a second target hash value; and performing authenticity verification on the target game data of the current target node by verifying the first target hash value and the first hash value, and the second target hash value and the second hash value; and after the performing authenticity verification on the target game data of the current target node by verifying the first target hash value and the first hash value, and the second target hash value and the second hash value, the method further comprises:

determining that the target game data of the current target node is the authentic data when it is found through verification that the first target hash value is consistent with the first hash value, and the second target hash value is consistent with the second hash value.

5. The method according to claim 4, wherein after the performing authenticity verification on the target game data of the current target node by verifying the first target hash value and the first hash value, and the second target hash value and the second hash value, the method further comprises:

determining that the target game data of the current target node is forged data when any one of the following is found through verification: the first target hash value is inconsistent with the first hash value, or the second target hash value is inconsistent with the second hash value.

6. The method according to claim 1, wherein the game state data comprises an initial state, an operation state, and an end state, and the performing accuracy verification on the target game data of the current target node according to the game state data of the current target node and game logic comprises:

superimposing the operation state of the current target node on the initial state of the current target node according to the game logic, to obtain a target state; and performing accuracy verification on the target game data of the current target node by verifying the target state and the end state of the current target node; and after the performing accuracy verification on the target game data of the current target node by verifying the target state and the end state of the current target node, the method further comprises:

determining that the target game data of the current target node is the accurate data when it is found through verification that the target state is consistent with the end state of the current target node.

7. The method according to claim 6, wherein after the performing accuracy verification on the target game data of the current target node by verifying the target state and the end state of the current target node, the method further comprises:

determining that the target game data of the current target node is inaccurate data when it is found through verification that the target state is inconsistent with the end state of the current target node.

8. An electronic device, comprising a processor and a memory, the memory storing a plurality of instructions that, when executed by the electronic device, cause the electronic device to perform a game data verification method including:

acquiring a load parameter of a server device according to a time interval parameter:

determining a target verification factor based on the load parameter in response to a game start instruction:

determining a quantity of target nodes according to the target verification factor;

selecting a plurality of target nodes from a game node sequence according to the quantity of target nodes;

generating a target sequence based on the plurality of selected target nodes:

acquiring target game data corresponding to each of the plurality of selected target nodes, the target game data comprising game state data and encrypted state data, the encrypted state data of adjacent target nodes in the target sequence having an association relationship;

performing authenticity verification on the target game data of a current target node according to the encrypted state data of a previous target node and the game state data of the current target node, the previous target node being immediately preceding the current target node in the target sequence;

performing accuracy verification on the target game data of the current target node according to the game state data of the current target node and game logic; and after determining that all the target game data corresponding to the target sequence is authentic data and accurate data based on an authenticity verification result and an accuracy verification result, determining that game verification indicated by the game start instruction succeeds.

9. The electronic device according to claim 8, wherein the determining a target verification factor based on the load parameter comprises:

acquiring a mapping relationship between load ranges and verification factors;

determining a load range within which the load parameter falls as a target load range; and determining a verification factor corresponding to the target load range as the target verification factor according to the mapping relationship.

10. The electronic device according to claim 8, wherein the selecting the plurality of target nodes from a game node sequence according to the quantity of target nodes, and generating the target sequence based on the plurality of selected target nodes comprises:

acquiring a node priority corresponding to each game node in the game node sequence;

selecting the plurality of target nodes from the game node sequence based on the node priorities and the quantity of target nodes; and generating the target sequence by using the plurality of selected target nodes according to a chronological order of the target nodes in a game.

11. The electronic device according to claim 8, wherein the encrypted state data comprises a first hash value and a second hash value, the first hash value being obtained by performing a first hash calculation on the game state data of the current target node by a client device, and the second hash value being obtained by performing a second hash calculation on the encrypted state data of the previous target node by the client device;

the performing authenticity verification on the target game data of a current target node according to the encrypted state data of a previous target node and the game state data of the current target node comprises:

performing the first hash calculation on the game state data of the current target node to obtain a first target hash value;

performing the second hash calculation on the encrypted state data of the previous target node to obtain a second target hash value; and performing authenticity verification on the target game data of the current target node by verifying the first target hash value and the first hash value, and the second target hash value and the second hash value; and after the performing authenticity verification on the target game data of the current target node by verifying the first target hash value and the first hash value, and the second target hash value and the second hash value, the method further comprises:

determining that the target game data of the current target node is the authentic data when it is found through verification that the first target hash value is consistent with the first hash value, and the second target hash value is consistent with the second hash value.

12. The electronic device according to claim 11, wherein after the performing authenticity verification on the target game data of the current target node by verifying the first target hash value and the first hash value, and the second target hash value and the second hash value, the method further comprises:

determining that the target game data of the current target node is forged data when any one of the following is found through verification: the first target hash value is inconsistent with the first hash value, or the second target hash value is inconsistent with the second hash value.

13. The electronic device according to claim 8, wherein the game state data comprises an initial state, an operation state, and an end state, and the performing accuracy verification on the target game data of the current target node according to the game state data of the current target node and game logic comprises:

superimposing the operation state of the current target node on the initial state of the current target node according to the game logic, to obtain a target state; and performing accuracy verification on the target game data of the current target node by verifying the target state and the end state of the current target node; and after the performing accuracy verification on the target game data of the current target node by verifying the target state and the end state of the current target node, the method further comprises:

determining that the target game data of the current target node is the accurate data when it is found through verification that the target state is consistent with the end state of the current target node.

14. The electronic device according to claim 13, wherein after the performing accuracy verification on the target game data of the current target node by verifying the target state and the end state of the current target node, the method further comprises:

determining that the target game data of the current target node is inaccurate data when it is found through verification that the target state is inconsistent with the end state of the current target node.

15. A non-transitory computer-readable storage medium, storing a plurality of instructions that, when executed by a processor of an electronic device, cause the electronic device to perform a game data verification method including:

acquiring a load parameter of a server device according to a time interval parameter;

determining a target verification factor based on the load parameter in response to a game start instruction;

determining a quantity of target nodes according to the target verification factor;

selecting a plurality of target nodes from a game node sequence according to the quantity of target nodes;

generating a target sequence based on the plurality of selected target nodes;

acquiring target game data corresponding to each of the plurality of selected target nodes, the target game data comprising game state data and encrypted state data, the encrypted state data of adjacent target nodes in the target sequence having an association relationship;

performing authenticity verification on the target game data of a current target node according to the encrypted state data of a previous target node and the game state data of the current target node, the previous target node being immediately preceding the current target node in the target sequence;

performing accuracy verification on the target game data of the current target node according to the game state data of the current target node and game logic; and after determining that all the target game data corresponding to the target sequence is authentic data and accurate data based on an authenticity verification result and an accuracy verification result, determining that game verification indicated by the game start instruction succeeds.

16. The non-transitory computer-readable storage medium according to claim 15, wherein the determining a target verification factor based on the load parameter comprises:

acquiring a mapping relationship between load ranges and verification factors;

determining a load range within which the load parameter falls as a target load range; and determining a verification factor corresponding to the target load range as the target verification factor according to the mapping relationship.

17. The non-transitory computer-readable storage medium according to claim 15, wherein the selecting the plurality of target nodes from a game node sequence according to the quantity of target nodes, and generating the target sequence based on the plurality of selected target nodes comprises:

acquiring a node priority corresponding to each game node in the game node sequence;

selecting the plurality of target nodes from the game node sequence based on the node priorities and the quantity of target nodes; and generating the target sequence by using the plurality of selected target nodes according to a chronological order of the target nodes in a game.

* * * * *